United States Patent [19]
St. Clair et al.

[11] Patent Number: 5,805,171
[45] Date of Patent: Sep. 8, 1998

[54] TECHNICAL SCHEMATIC DISPLAY SYSTEM UTILIZING PREASSIGNED COMPONENT DETAIL LEVELS

[75] Inventors: Daniel C. St. Clair, Wentzville; John J. Aleshunas, St. Charles; J. Todd Kneib, St. Charles; Gerald L. Hagedorn, St. Charles, all of Mo.

[73] Assignee: Van Houten Technologies, Inc., St. Peters, Mo.

[21] Appl. No.: 684,694

[22] Filed: Jul. 19, 1996

[51] Int. Cl.$^6$ .................................................. G06T 3/00
[52] U.S. Cl. ............................................................ 345/433
[58] Field of Search .................................. 345/433–439, 345/326, 333, 334, 335, 348–351, 356, 357

[56] References Cited

U.S. PATENT DOCUMENTS

| | | | |
|---|---|---|---|
| 4,413,286 | 11/1983 | Boston | 358/460 |
| 4,603,431 | 7/1986 | Grover et al. | 382/241 |
| 4,718,105 | 1/1988 | Lipkie et al. | 382/243 |
| 5,075,779 | 12/1991 | Lefebvre et al. | 358/298 |
| 5,426,780 | 6/1995 | Gerull et al. | 707/3 |
| 5,548,330 | 8/1996 | Hieda et al. | 348/234 |
| 5,625,765 | 4/1997 | Ellenby et al. | 395/135 |

*Primary Examiner*—Almis R. Jankus
*Attorney, Agent, or Firm*—Polster, Lieder, Woodruff & Lucchesi, LC

[57] ABSTRACT

A schematic display system for displaying selected areas of interest of a schematic includes a display screen, preprocessed display data stored in a data structure, and a digital processor for controlling the level of detail of the display in accordance with level of detail values preassigned to component primitives of the schematic objects. The level of detail values are, in part, a function of the resolution of the display screen, and are selected to display details of the schematic as such detail would become visually meaningful to a human user of the system. The system includes provision for user defined restricted schematics which eliminate objects, connections, etc. from that display (but not from the basic underlying schematic) as specified by the user. It also includes provision for custom schematics which simultaneously display areas of interest on the screen, the displayed areas of interest being non-adjacent areas, areas from different functional schematics (electrical and structural), etc. based on the basic underlying schematic(s). Both restricted schematics and custom schematics are stored economically for future selection and retrieval. The system allows the user to change the displayed scale of the area of interest, while keeping the center of view on the schematic substantially constant as the displayed scale is changed.

13 Claims, 22 Drawing Sheets

TECHNICAL SCHEMATIC DISPLAY SYSTEM UTILIZING PREASSIGNED COMPONENT DETAIL LEVELS

BACKGROUND OF THE INVENTION

This invention relates to the display of schematics, such as those used in inspection and repair of equipment, and more particularly to a system for display of such schematics which is particularly suited for use by a human operator during the inspection/repair process.

With the widespread use of computer aided design and computer aided manufacturing, electronic (predominantly raster) versions of various schematics are now available. These can take the form of stand-alone electronic drawings, in the simplest case, or can be part of electronic technical manuals. The drawings can represent the simplest of consumer products, or complex systems like automobiles and aircraft. Such drawings are particularly useful for maintenance technicians, since they provide (1) ready access to supplemental data relating to a product, (2) learning aids to increase the technicians skill and knowledge with respect to the product, and (3) invaluable assistance in troubleshooting a problem. They are, of course, also used in the design and manufacture of products and systems. It would be desirable to tie together all these various functions together in one, easily available system.

Although electronic schematics drawings are readily displayable using conventional computer equipment, they could be improved. For example, electronic schematics can be displayed on a desktop CRT display, but for some purposes (such as inspection and trouble-shooting) it would be preferable to have a portable display. Portable schematic display systems have been designed, which house all the information a technician needs to perform each maintenance task. But with these systems (as indeed with stationary display systems) display of graphical information is the greatest challenge. The computer screen of portable display systems is smaller and oriented differently than a paper page, and the resolution is far inferior (300–600 dpi paper to approximately 90 dpi screen, for example). Even stationary displays conventionally lack the resolution of a paper schematic.

Although the resolution of computer screens is adequate for text applications, the coarse resolution and (in the case of portable display systems) small overall screen size make the display of detailed graphic information difficult. Most procedural graphics are capable of being decomposed into small chunks and simplified for clear display; however, schematics used for troubleshooting are not amenable to such treatment. Unfortunately, of all technical data in the field, schematics are probably used the most and in the most desperate of circumstances. Current schematic displays on a small screen usually force the user to zoom, pan, and scroll to view the full schematic. Users are easily lost and must manipulate the display to get what they need to see on the screen in a usable form.

Schematics are often complicated and hard to read for the novice. And when translated to a small computer screen, even a skilled technician may find them difficult to use, in part because of the immense amount of detail. It would be desirable to both facilitate the manipulation of an electronic schematic on a computer screen, and simplify the display of information on the schematic itself.

SUMMARY OF THE INVENTION

Among the various objects and features of the present invention may be noted the provision of a schematic display system which improves the display of needed information on a schematic without adding unnecessary and unwanted detail.

Another object is the provision of such a schematic display system which facilitates the use of an electronic schematic.

A third object is the provision of such a schematic display system which displays only needed portions of a schematic.

A fourth object is the provision of such a schematic display system which controls in a meaningful and visually significant manner the level of detail at which a schematic is displayed.

A fifth object is the provision of such a schematic display system which facilitates the display of the schematic at a different level of detail at the technician's request.

A sixth object is the provision of such a schematic display system which allows the technician to move easily from one schematic to another, or from one area of interest to another in a given schematic.

A seventh object is the provision of such a schematic display system which allows the technician to control the sequence of presentation.

An eighth object is the provision of such a schematic display system which allows authorized personnel to define restricted and custom schematics, and which facilitates their storage, retrieval and use.

A ninth object is the provision of such a schematic display system which facilitates a return to the portion of a schematic which was last viewed by the technician.

A tenth object is the provision of such a schematic display system which requires relatively conventional computer hardware for its implementation.

An eleventh object is the provision of such a schematic display system which may be readily and reliably updated as the basic engineering schematic is updated.

A twelfth object is the provision of such a schematic display system which enhances troubleshooting procedures through intelligent schematic techniques.

Other objects will be in part apparent and in part pointed out hereinafter.

Briefly, in a first aspect of the present invention, a schematic display system includes a memory having stored therein a data structure corresponding to a schematic to be displayed, a processing unit operatively connected to the memory for retrieving data from the memory data structure, and a visual display device under control of the processing unit for displaying at least selected portions of the schematic. The system also has manually operable inputs operatively connected to the processing unit for initiating manual requests for changing the scale at which at least a selected portion of the schematic is displayed on the display device. The processing unit is responsive to the manual requests to change the schematic scale correspondingly. The data structure stored in the memory includes at least a plurality of data representations of schematic objects, at least some of the schematic objects being composed of a plurality of component data objects, each component data object of a schematic object having an assigned level of detail, which assigned level of detail may differ for different component data objects of a given schematic object. The data structure further includes data representations of connections between the schematic objects. The processing unit is responsive to the selected scale at which the schematic is to be displayed to display only those component data objects whose assigned level of detail corresponds to the selected scale of display.

In a second aspect of the present invention, a schematic display system includes a memory having stored therein preprocessed data representative of a schematic to be displayed, a digital processor operatively connected to the memory for retrieving preprocessed data from the memory, a visual display device under control of the processor for displaying at least selected portions of the schematic, and inputs operatively connected to the processor for requesting a change in the scale at which at least a selected portion of the schematic is displayed on the display device. The processor is responsive to said requests to change the schematic scale correspondingly. The preprocessed data representative of the schematic includes data representations of schematic objects, at least some of said schematic objects being composed of a plurality of component data objects, and at least some of the component data objects of a schematic object having an assigned level of detail, which assigned level of detail may differ for different component data objects of a given schematic object. The assigned level of detail is automatically preassigned as a function of at least one display parameter of the visual display device, such as display resolution.

In a third aspect of the present invention, a schematic display system includes a memory having stored therein preprocessed data representative of a schematic to be displayed, a digital processor operatively connected to the memory for retrieving preprocessed data from the memory, and a visual display device under control of the processor for displaying at least selected portions of the schematic, the displayable area of said visual display device being known and being taken into account in preparing the preprocessed data. Inputs are operatively connected to the processor for selecting areas of interest of the schematic, the inputs requesting a widening or narrowing of an area of interest. The processor is responsive to an input indicative of a request for changing the width of the area of interest to determine, from the preprocessed data and the size of the area of interest, the level of detail at which the requested area of interest is to be displayed on the display device.

In a fourth aspect of the present invention, a schematic display system includes a memory having stored therein data representative of a schematic to be displayed, a digital processor operatively connected to the memory for retrieving schematic data from the memory, and a visual display device under control of the processor for displaying at least selected portions of the schematic. Inputs are operatively connected to the processor for selecting areas of interest of the schematic, the inputs defining at least a pair of separate areas of interest (which can, for example, be non-contiguous or from functionally different schematics for the same piece of equipment), and associating the pair of areas of interest together in a custom schematic. The processor is responsive to the inputs to store the identities of the selected areas of interest in the memory so that upon an input requesting display of the custom schematic the digital processor retrieves the identities from memory and controls the display device to display the custom schematic.

In a fifth aspect of the present invention, a schematic display system includes a memory having stored therein data representative of a schematic to be displayed, a digital processor operatively connected to the memory for retrieving schematic data from the memory, and a visual display device under control of the processor for displaying at least selected portions of the schematic. Inputs are operatively connected to the processor for selecting areas of interest of the schematic and for requesting a widening or narrowing of an area of interest. The processor is responsive to an input indicative of a request for changing the width of the area of interest to keep the geometric center of the displayed area interest substantially the same irrespective of the amount of requested change of the width of the area of interest.

BRIEF DESCRIPTION OF THE DRAWINGS

Similar reference characters indicate similar parts throughout the several views of the drawings.

DESCRIPTION OF THE PREFERRED EMBODIMENTS

Figure 1:
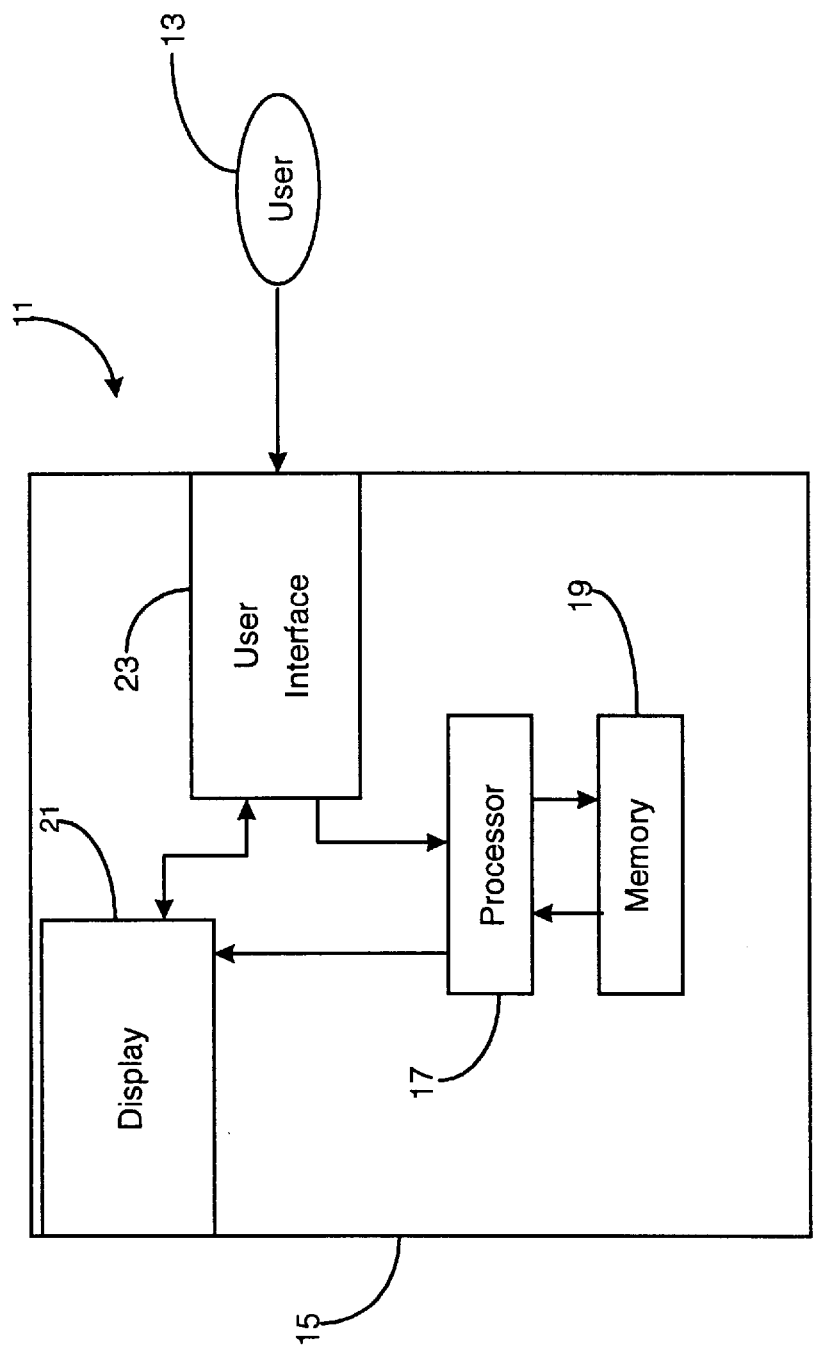
FIG. 1 is a block diagram of the schematic display system of the present invention.

Turning now to the drawings, there is shown a schematic display system 11 of the present invention, operable by a user/technician 13. By way of illustration system 11 is embodied in a portable computer 15 having a processor 17, a memory 19, a display 21, and a user interface 23. All of these components can be, and preferably are, conventional. The user interface, for example, includes a keyboard and pointing device (such as a track ball, pointing pad, or equivalent) by means of which the user can enter requests and information. The memory can include RAM, various forms of ROM, and hard-drive storage.

The memory 19 has stored therein a data structure particularly suited for the display of schematics on display 21 in a clear and logical manner. The present display system does not display electronic schematic files in the form generated by conventional computer aided design/manufacturing tools. Rather, these electronic schematic files are preprocessed by system 11 to be put into the data structure form described below. Specifically, the system converts an input file from an engineering design tool into a format that is useful to the run-time display of schematics. This processing creates a hierarchy of relationships within the schematic data which is absent from the input file.

At the top of the hierarchy are ModelFiles. The ModelFiles contain schematics of three types: base, restricted, and custom (as labeled in FIG. 2). The restricted and custom schematics are special cases of the base schematics. They are defined using the base schematic and leaving out components (restricted schematics) or defining multiple simultaneous Areas of Interest (AOI) (custom schematics).

The base schematic construct contains several data entities. The schematic graphic data is made up of AOIs (Areas of Interest), devices, connectors, and connectivity information.

Areas of Interest are pre-defined views of the schematic information. In other words, they are pre-defined views within a schematic for display in a presentation viewport (display 21). The AOI location, height, and width control what is displayed in the display viewport. System 11 utilizes a user-centric data model that reverses the logical hierarchy and references the schematic from the selected AOI. This is because the user 13 normally thinks of a particular screen image (pump, circuit breaker box, robot arm assembly, etc.) rather than the schematic that contains the image. Therefore, user 13 selects an AOI label and that AOI label points to that portion of the schematic which contains this AOI.

Figure 2:
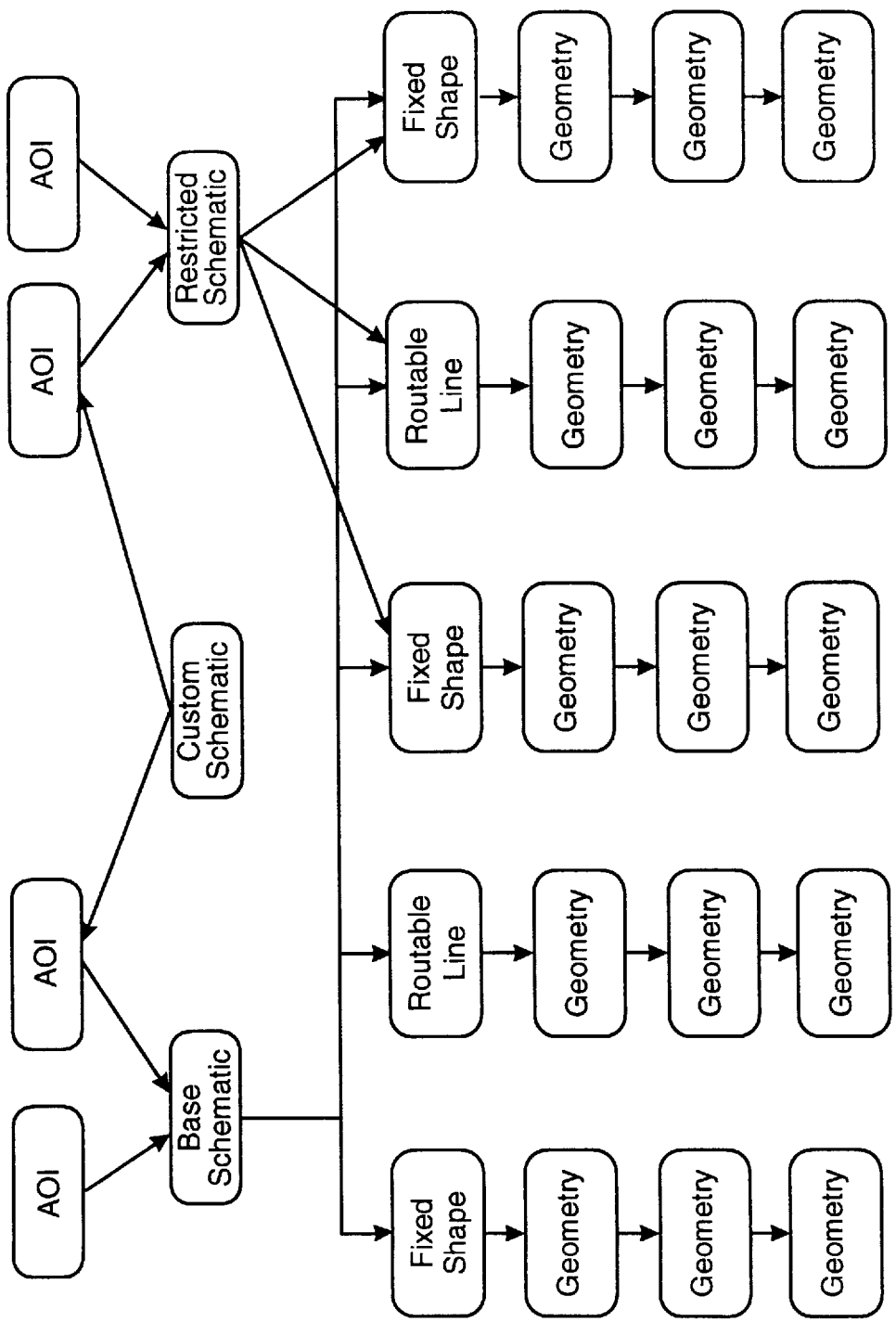
FIG. 2 is a block diagram illustrating data structures used by the schematic display system of FIG. 1.

As illustrated in block-diagram form in FIG. 2, there are two types of devices: fixed shapes and routable lines. Fixed shapes are a set of graphic primitives (also called component data objects) grouped together as one graphic entity. Graphics primitives are those components (lines, circles, arcs, text, etc.) which are drawn directly on the display screen 21 by the graphics system. In the memory 19, these primitives are grouped together and assigned to a fixed shape using a geometry_list_type data structure, described below. In general terms, a group of graphics primitives and their attributes make up graphic entities (also called schematic objects) which are objects of interest in the graphic system, such as pumps, switch boxes, tanks, etc. Additionally, other information is associated with the fixed shape using the device_fixed_shape_type data structure, also described below.

Similarly, routable lines are collections of lines grouped together and treated as one graphic entity. The geometry_list_type data structure is used to describe the lines comprising a routable line entity. Other information is associated with the routable line using a device_routable_line_type data structure. These devices are grouped in a schematic using the device_list_type data structure.

Connectors define the entities where devices connect. The connectors are associated with the devices they are part of and are described in the data file using the connector_list_type data structure. This data definition supports the tracing of device connectivity. Connectivity is defined by cross-referencing several data structures: a connector_id_list_type, a device_id_list_type, a dev_to_con_list_type, a con_to_dev_list_type, and a schematic_to_connector_list_type. This data relation allows the creation of a connectivity web where devices have associated connectors which are connected to other connectors attached to other devices and the like.

Restricted schematics are limited qualifications of base schematics with some devices, connectors, and connectivity data removed. This is easily managed by creating a list of pointers to the data in the base schematic that is included in the restricted schematic. The data is stored only once, in the base schematic portion of the file, giving system 11 efficient data storage and consistent data portrayal. A restricted schematic simplifies the data of the base schematic to place emphasis on particular structures or processes. All of the underlying information from the original base schematic is still valid but, in this special case, some of it is not displayed.

Custom schematics are collections of AOI from a base or restricted schematic identified for simultaneous display. They have all of the information available in the underlying base or restricted schematic in the multiple opened display AOI. Custom schematics support specific procedures where multiple distant locations must be displayed without need to show the detail between them or where different systems (electrical, hydraulic, mechanical, etc.) must be viewed simultaneously.

Storage of a Base Schematic

The preprocessing of the schematic data in more specific terms involves the following steps:

For each device the processor (or a preprocessor if the preprocessing step is implemented on a computer other than that illustrated in FIG. 1) sets the following device information:
device id
device label (not on Routables)
device label coordinate
device description
device icon type
This information is stored in class variables until the geometry for the device is processed and the device is stored in a linked list.

Based on the device icon type, the device will be either a fixed shape or a routable line. The difference is how the geometry is processed. For fixed shapes, the geometry is collected by repeated calls to either an Add_circle or an Add_line routine. Both routines simply add the geometry to the same current device geometry list. For routable lines, the geometry is collected by parsing the routable points into lines calling the Add_line routine to store them into the current device geometry list. Device information is added to a linked list with the other devices in the schematic.

The description and geometry are written to file at this time because no further processing is done to them. This storage of device information is handled by routines Store_device_fixed_shape and Store_device_routable_line, both of which call routines named Write_geometry_to_file and Write_description_to_file. Writing of the Device list to file is handled by routines Write_routable_device_list_to_file and Write_fixed_device_list_to_file, which are separate to assure that the proper information is saved for each type.

Connectors in the schematic are preprocessed in a similar manner. Specifically, The connector's id is captured by a call to a Set_connector_id routine. In response a node on the current_connector_list is created and this information is placed in that node. Spaces for geometry location (both pointer in memory, and in the geometry file) are initially NULL. The connector geometry is collected by repeated calls to either Add_circle or Add_line. Both simply add the geometry to the same current connector geometry list. When all the geometry for the current connector has been added to the current connector geometry list, the list is attached to the current connector node on the current_connector_list.

A copy of the current_connector_list is saved once all the connectors for the schematic have been read in using a routine called Write_connector_geometry_to_temp_file. Once the base schematic is saved, the list of connectors is added to another list, and pointed to a node with the base schematic name in it. This is used to recall the original connectors when dealing with Restricted Schematics. The file this creates holds the geometry so when the connectors in the restricted schematics are recreated, system 11 has the original geometry to work from. The connector information is not written to file until the connectivity has been computed.

The preprocessing of connectivity is accomplished in a sequence that starts by calling a routine named Set_connectivity with the device and connector ids from one line of connectivity in the schematic file. Set_connectivity is called for each line of connectivity. The first call Set_connectivity makes is to Get_connectivity_list. This is sent the connector ids that need to be connected. It returns a list (current_connectivity_list) that contains the information about those connectors that is in the current_connector_list (id's and geometry). The routine Set_connectivity then sends this list to a routine named Remove_redundant_ geometry, which takes the geometry of the first connector and compares it to the other connector's geometry, removing those that are within tolerance. It then loops down through the list, checking the next connector against the ones below it, until all have been checked. The set_connectivity routine then takes the current_connectivity_list and sends it through a Group_connector_geometry routine, which groups the remaining geometry together into one list and returns that list.

The set_connectivity routine sends the geometry list to a Create_new_connector routine, which creates a node on the New_connector_list, puts the new_connector_id in it and adds the geometry. The set_connectivity routine then calls a Add_connector_to _device_to_connector_list routine, which sends the list of devices that are associated with the original connectors. The routine knows what the new_connector_id is, so it loops through the device_to_ connector list, adding the connector_id to each of the device's device_to_connector entry.

Similarly, to add a device to the connector list, the Set_connectivity routine calls a Create_connector_to_ device_node routine, which attaches the device to the current_connector_to_device_list. It attaches a copy of the device list (the listing of devices associated with the original connectors).

The device_to_connector and connector_to_device lists are saved using Write_con_to_dev_list_to_file and Write_dev_to_con_list_to_file routines, which are similar in function. The file record used to store either list has one field for the Primary item (the first one, i.e. connector for Connector_to_device or device for device_to_connector) and two fields for the secondary items. This means that if there is more than a one to two ratio, it will be spanned across two or more records. This is achieved by putting the same Primary item id on each record, and taking the next two secondary items and putting them in. This is done until all of secondary data is saved. If there is an odd number of secondary data, the second spot of the last record entry for that node, is filled with a zero id.

The connector information is stored with Write_ connector_list_to_file. This uses the Write$_{13}$ geometry$_{13}$ to_file routine for the geometry. It simply writes the New_ connector_list to file, using one record per node. As each node of device_to_connector and connector_to_device in the list is written out, its memory is freed. The list for connectors is not. A new node on the schematic_to_ connector_list is created, and the connector list is attached to this node.

Area of Interest (AOI) information is preprocessed as follows:

Basic AOI information is gathered with calls to routines to set the AOI name, set the AOI header, set the grouping, set the schematic upper left point, set the schematic height and set the schematic width. Once this information has been gathered, it is added, as a node, to the current_aoi_list.

Once all the AOIs for the given schematic have been added to the current_aoi_list, a Write_aoi_list_to_file routine is called to save them to file. The structure being written to file contains all the AOI data, plus an extra field that is used with custom schematics. For base and restricted schematics, this field is set to zero. As each node in the list is written out, its memory is freed.

Storage of the schematic information at the schematic level is handled by a Store_schematic_info_to_file routine. This procedure calls the Write_connector_list_to_ file routine to save the connector data. The Write_ connector_list_to_file routine returns the file location of the first connector, and this is stored in the outgoing_ schematic structure. It performs this same pattern for routines labeled Write_dev_to_con_listto_file, and Write_ con_to_dev_list_to_file. On routable lines and fixed shapes, only the device starting point is saved. The device records point to the routable lines or fixed shape records. The schematic_device_file_pointer is stored in the outgoing_ schematic structure before the routable lines and fixed shape lists are saved. They are saved by calls to a Write_routable_ device_list_to_file routine. In this routine, along with the above information, the schematic size, schematic origin, and schematic type (base, restricted, and custom) are stored in to the outgoing_schematic structure and then written to file.

Processing of a Restricted Schematic

To store a restricted schematic, system 11 loads the base schematic information (discussed above) into memory. System 11 then calls an Add_device_to_list routine to send the devices to be in the restricted schematic. This function also calls an Add_device_to_dev_to_con_list routine, which searches the base schematics dev_to_con_list and copies that device's entry into the current_device_to_ connector_list. System 11 then calls an Add_connectors_ to_list routine, which takes the connectors in the current_ device_to_connector_list and searches the base schematics con_to_dev_list and adds that information to current_connector_to_device_list. System 11 then calls a Create_restricted_schematic routine, which recreates the connectors that need geometry removed (described in connectors section).

In constructing the data structures for a restricted schematic, only the device information nodes are rewritten to the file structure. Since there is no change in devices from base schematic to restricted schematic, the device information simply points back to the routable line and fixed shape entries.

Storage of a restricted schematic is accomplished with the Write_restricted_devices_to_file routine.

The treatment of connectors in the restricted schematics is as follows: Within the routine Create_restricted_ schematic, the connector_to_device list is examined entry by entry, checking if the list has devices that are not part of the Restricted Schematic. Entries that do are checked to determine if they have any lines. If they do, their geometry is rechecked to remove any lines and circles that are connected to the devices that are not part of the restricted schematic. Connectors altered in this manner are placed on the new_connector_list.

Only the connectors on the new_connector_list need their geometry data saved for restricted schematics. (The others are mapped back to the already saved geometry). To do this, the Write_connector_list_to_file has a parameter flag for Save geometry or not. In this case it would be set to save. The connectors left on the current_connector_list did not change and are saved with the DONT_SAVE_ GEOMETRY flag.

In restricted schematics, connectivity is processed by reading the dev_to_con and con_to_dev entries from the base schematic the restricted schematic is based on. Only those entries that are part of the restricted schematic are copied. The con_to_dev list (which was created by retrieving all the connectors that are listed in the dev_to_conn list), lists all of the devices connected to that connector, even devices not in the restricted schematic. To remove these the system calls a routine labeled Remove_access_devices_ from_con_to_dev_list. Storage for connectivity is handled the same as with base schematics (discussed above).

Areas of Interest (AOIs) for restricted schematics are handled the same as AOIs for base schematics (see above).

Processing of a Custom Schematic

Custom schematics only combine existing AOIs, so there is no processing of devices and connectors. AOIs are processed as follows: The system gets the name of the AOI to be included and calls the routine Load_aoi. This pulls up the AOI's information so it can be used to create the custom AOI. The system then calls routines to set the window upper left point, window height, and window width information for the AOI. This information is stored on the current_aoi_list by the routine Store_aoi_to_file.

The custom schematic name is put on all the AOIs for that custom schematic. Saving of a custom AOI is the same (Write_aoi_list_to_file) except that along with each having the same name, the next pointer is not zero. Instead, only the last entry will be zero, all the others will point to the next one. This is how the system knows a custom schematic, and where the next AOI for the custom schematic is located.

Major Data Structures

The schematic display system 11 of the present invention has the following major data structures:

```
typedef struct {long int x;
               long int y;
} coordinate_type;
typedef struct {coordinate_type up_left;
               coordinate_type lower_right;
} bounding_area_type;
typedef struct geometry_list_type {
               primitive_type primitive_class;
               coordinate_type first_point;
               coordinate_type second_point;
               color_type color;
               int line_width;
               line_style_type line_style;
               int level_of_detail
               boolean_type circle_fill;
               struct geometry_list_type *next;
} geometry_list_type;
typedef struct device_fixed_shape_type {
               char device_id[MAX_ID_LEN+1];
               device_icon_type device_icon;
               char device_label[MAX_DEV_LABEL_LEN+1];
               coordinate_type label_coordinate;
               char
base_schematic_name[MAX_SCH_NAME_LEN+1];
               unsigned long int geometry_location;
               unsigned long int description_location;
               struct device_fixed_shape_type *next;
} device_fixed_shape_type;
typedef struct device_routable_line_type {
               char device_id[MAX_ID_LEN+1];
               flow_type flow_direction;
               bounding_area_type bounding_area;
               char
base_schematic_name[MAX_SCH_NAME_LEN+1];
               unsigned long int geometry_location;
               unsigned long int description_location;
               struct device_routable_line_type *next;
} device_routable_line_type;
typedef struct connector_list_type {
               unsigned long int old_connector_id;
               char device_id[MAX_ID_LEN+1];
               char old_string_id[MAX_ID_LEN+1];
               unsigned long int new_connector_id;
               unsigned long int geometry_location;
               geometry_list_type *connector_geometry_location;
               struct connector_list_type *next;
} connector_list_type;
typedef struct device_list_type {
               char device_id[MAX_ID_LEN+1];
               device_icon_type device_icon;
               unsigned long int device_location;
               unsigned long int geometry_location;
               int number_of_ids;
               struct device_list_type *next;
} device_list_type;
typedef struct connector_id_list_type {
               unsigned long int connector_id;
               struct connector_id_list_type *next;
} connector_id_list_type;
typedef struct dev_to_con_list_type {
               char device_id[MAX_ID_LEN+1];
               unsigned long int number_of_connectors;
               connector_id_list_type *old_connector_ids;
               connector_id_list_type *new_connector_ids;
               int number_of_ids;
               struct dev_to_con_list_type *next;
} dev_to_con_list_type;
typedef struct device_id_list_type {
               char device_ids[MAX_ID_LEN+1];
               struct device_id_list_type *next;
} device_id_list_type;
typedef struct con_to_dev_list_type {
               unsigned long int new_connector_id;
               int number_of_devices;
               device_id_list_type *device_ids;
               struct con_to_dev_list_type *next;
} con_to_dev_list_type;
typedef struct schematic_to_connector_list_type {
               char
base_schematic_name[MAX_SCH_NAME_LEN+1];
               connector_list_type *original_connectors;
               dev_to_con_list_type * new_con_id_to_old_id_list;
               struct schematic_to_connector_list_type *next;
} schematic_to_connector_list_type;
typedef struct name_struct {
               char string[40];
               struct name_struct *next;
} name_struct;
```

Level of Detail

Figures 3, 4:
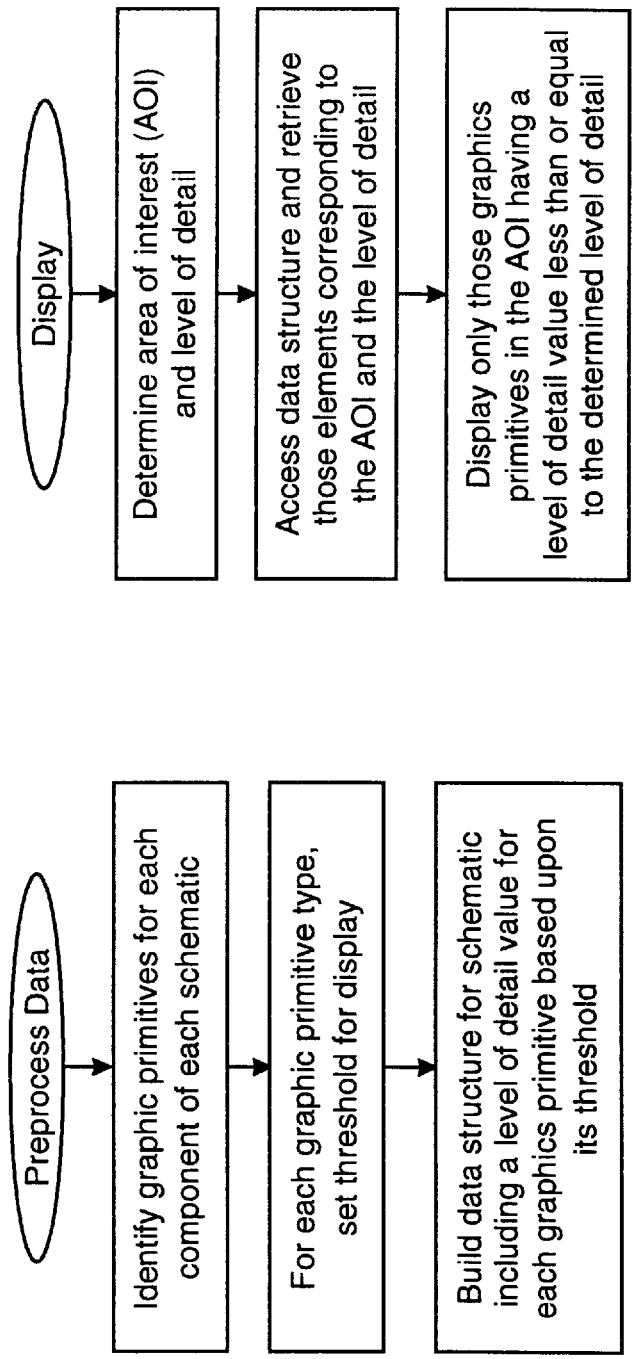
FIG. 3 is a simplified flow chart illustrating the preprocessing of schematic data for the data structures of FIG. 2.
FIG. 4 is a simplified flow chart illustrating the display procedure of the schematic display system of FIG. 1.

The schematic display system 11 of the present invention differs fundamentally from known systems in that graphics primitives (component data objects such as lines, circles, arcs, text, etc. which make up a graphic entity) are preprocessed to have an assigned level of detail value. This is illustrated in FIG. 3, in which the preprocessing step (discussed in general terms above) includes identifying the graphics primitives, setting a threshold for display of each graphics primitive (usually in terms of numbers of pixels required to meaningfully display the graphics primitive), and then using that threshold to set a level of detail value for the corresponding graphics primitive in the data structure. This is not a display step, but rather a preprocessing step for determining how graphic entities (pumps, switches, etc. on the schematic) are to be displayed as the schematic is displayed at varying levels of detail. The display step (illustrated in block form in FIG. 4) uses the level of display value for the graphics primitives in a given AOI to retrieve for display only those graphics primitives which have a level of detail value which corresponds to the current level of detail of the AOI displayed. (As will become apparent, this means that as the level of detail of the display increases, more and more graphics primitives are displayed, while at the same time a smaller and smaller area of the overall schematic is displayed. A graphics primitive in the field of view is displayed automatically when its level of detail value equals the level of detail of the display, and it continues to be displayed at all higher levels of detail. It is automatically removed from display when the level of detail of the display falls below its preassigned level of detail value.)

The present scheme of assigning level of detail values to graphics primitives, and displaying the primitives automatically when the display is at the same (or higher) level of detail provides sharp, crisp displays even on small computer screens by controlling the density of the graphics entities being displayed. This is accomplished in two steps. The first step is the LOD (level of detail) assignment procedure, which examines each graphics primitive in each graphic entity and assigns a level of detail value to that primitive. This procedure is a component of the preprocessing step for graphics data preparation, discussed above. The second component is a real-time display procedure, which determines, at display time, those graphic primitives of an entity which are to be displayed. This procedure is a component of the real-time display program of processor 17. Both procedures are discussed below.

The Level of Detail Assignment Procedure

The objective of the level of detail assignment procedure is to determine the lowest level of detail (LOD) at which a graphics primitive should be displayed. This procedure is executed during the graphics data preprocessing step. One approach to the objective is to develop a LOD Table which correlates LOD value with per cent reduction of each graphic primitive of each graphic entity being drawn (the smaller the per cent reduction, the higher the LOD). These values are determined experimentally based on user preferences, the objects being displayed, and the particular display screen being used. Similar tables are developed for graphic attributes like fonts, line sizes, and line styles (see discussion of Level of Detail Real-Time Algorithm below).

In determining the proper level of display values for a particular display screen, it is necessary to determine the display screen parameters DISPLAY_WIDTH_PIXELS _PER_IN and DISPLAY_HEIGHT_PIXELS_PER_IN, both of which are constant. It is also necessary to associate a threshold number of pixels with each graphic primitive. For example, a circle which takes up only four pixels on a particular display screen is not recognizable as a circle, and so should not be displayed as a circle.

Once the pixel threshold is determined, the level of detail at which each graphic primitive of each graphic entity is first displayed is determined. At a given per cent reduction (and its associated LOD), if the number of pixels required to display a graphics primitive falls below the corresponding threshold number of pixels, the graphics primitive will NOT be displayed. From this threshold information, system 11 determines the LOD value for which the graphics primitive should first be displayed. This level of detail value is recorded with the graphics primitive.

The following pseudocode is intended to illustrate the LOD assignment procedure, and is not meant to indicate that it depends on any specific graphics windowing system. It is designed to allow user preferences to be accommodated by supporting adjustment of the parameters mentioned above. Values in the LOD_TABLE, for example, may be changed according to user tastes.

The global variables for the LOD assignment procedure are as follows:

```
1. Determination of the number of pixels/inch
   (These values are constant for a given display device.)
   DISPLAY_WIDTH_IN        Width of display in inches.
   DISPLAY_WIDTH_PIXELS    Width of display in pixels.
   DISPLAY_HEIGHT_IN       Height of display in inches.
   DISPLAY_HEIGHT_PIXELS   Height of display in pixels.
   DISPLAY_WIDTH_PIXELS_PER_IN =
      (DISPLAY_WIDTH_PIXELS) / (DISPLAY_WIDTH_IN)
   DISPLAY_HEIGHT_PIXELS_PER_IN =
      (DISPLAY_HEIGHT_PIXELS) / (DISPLAY_HEIGHT_IN)
2. Other global variables:
   NUMBER_PIXELS_REQUIRED_TO DISPLAY_CIRCLE
   (Constant used to control the number of pixels required in the side of the
   bounding box for a circle before the circle is displayed, which is
   preferably at least five)
   NUMBER_PIXELS_REQUIRED_TO_DISPLAY_LINE
   (Constant used to control the number of pixels required in determining
   whether or not a line should be displayed, which is preferably at least
   two
   pixels)
   LOD_TABLE
   (Gives the minimum % reduction for a given LOD. Used to determine
   LOD settings for each component to be drawn. Note that the values can
   be adjusted to meet user tastes.)
```

| LOD | % Reduction | Comments |
|---|---|---|
| 1 | 95% | Basic object outline displayed |
| 2 | 75% | |
| 3 | 55% | |
| 4 | 35% | |
| 5 | 15% | |
| 6 | 0% | Entire object is displayed |

```
POINTER_TO_CURRENT_GRAPHIC_ENTITY
(Pointer to current graphic entity of interest: device-fixed shapes, device-
routable lines, schematic_connector)
POINTER_TO_CURRENT_GRAPHIC_ENTITY_GEOMETRY
(Pointer to graphic component of current graphic entity. Value deter-
mined from the value stored in POINTER_TO_GEOMETRY of
the current device or of one of its geometry components.)
DEVICE_FIXED_SHAPES
(File or structure containing device_fixed_shape information)
DEVICE_ROUTABLE_LINES
(File or structure containing device_routable_lines information)
SCHEMATIC_CONNECTOR
(File or structure containing schematic_connector information)
```

The following pseudocode illustrates the various functions of the LOD assignment procedure.

Function Name: Calculate_LOD_For_All_Graphics_Objects

Description: Calculate LOD for each DEVICE_FIXED_SHAPES, DEVICE_ROUTABLE_LINES, AND SCHEMATIC_CONNECTOR Procedures Called: Determine_Geometry_Entity_LOD, Determine_Device_Routable_Lines_LOD, Determine_Schematic_Connector_LOD Output Variable(s): POINTER_TO_CURRENT_GRAPHIC_ENTITY External Data Modified: LOD settings in GEOMETRY file.

External Files: DEVICE_FIXED_SHAPES, DEVICE_ROUTABLE_LINES, AND SCHEMATIC_CONNECTOR, GEOMETRY Comments: Entities and their corresponding geometries were developed using X-Windows parametric graphic descriptions to use the X_Draw functions for the basic graphic shapes, although the present invention is not limited to any particular language or description. Variable names of the form <first part>.<second part> refer the component <second part> of the variable <first part>.

PDL:

/* Process DEVICE-FIXED SHAPES

For each DEVICE_FIXED_SHAPES

Set POINTER_TO_CURRENT_GRAPHIC_ENTITY to point to next DEVICE_FIXED_SHAPES

Determine_Geometry_Entity_LOD    /* Determine LOD for each geometry indicated by the value of GEOMETRY.GEOMETRY_TYPE which is pointed to by DEVICE_FIXED_SHAPES.POINTERS_TO_GEOMETRY /* Process DEVICE_ROUTABLE_LINES For each DEVICE_ROUTABLE_LINE Set POINTER_TO_CURRENT_GRAPHIC_ENTITY to point to next DEVICE_ROUTABLE_LINES Determine_Device_Routable_Lines_LOD /* Process SCHEMATIC_CONNECTOR For each SCHEMATIC_CONNECTOR Set POINTER_TO_CURRENT_GRAPHIC_ENTITY to point to next SCHEMATIC_

CONNECTOR

Determine_Schematic_Connector_LOD

Return to calling routine

Function Name:   Determine_Geometry_Entity_LOD

Description:   Determine LOD for each graphic entity by:

1) Determining dimensions of the bounding box for each component of a graphic entity's geometry.

2) Determining the level of detail where the bounding box is "large enough" to warrant displaying the component.

Calling Routines:   Calculate_LOD_For_All_Graphics_Objects,

Determine_Device_Routable_Lines_LOD,

Determine_Schematic_Connector_LOD

Procedures Called:   Absolute_Value, Maximum

Input Variable(s): POINTER_TO_CURRENT_GRAPHIC_ENTITY, POINTER_TO_

CURRENT_GRAPHIC_ENTITY_GEOMETRY, GEOMETRY,

DISPLAY_WIDTH_PIXELS_PER_IN, DISPLAY_HEIGHT_PIXELS_

PER_IN, NUMBER_PIXELS_REQUIRED_TO_ DISPLAY_CIRCLE,

NUMBER_PIXELS_REQUIRED_TO_DISPLAY_LINE

Internal Variable(s): finished_evaluating_geometry_lod, bounding_box_width_pixels, finished_evaluating_lod_for_current_geometry_component, lod_counter, lod_%reduction, display_box_width_pixels External Data Modified: LOD for each component of the graphic entity pointed to by

POINTER_TO_CURRENT_GRAPHIC_ENTITY_GEOMETRY

External Files: GEOMETRY, LOD_TABLE

Assumptions: 1) Schematic measurements (height, width, location) are in inches.

2) POINTER_TO_CURRENT_GRAPHIC_ENTITY_GEOMETRY is pointing at the geometry of the component pointed to by POINTER_TO_CURRENT_

GRAPHIC_ENTITY.

PDL:

Set POINTER_TO_CURRENT_GRAPHIC_ENTITY_GEOMETRY to correct location in

GEOMETRY file for the current graphic entity

/*This requires the POINTERS_TO_GEOMETRY field of the entity pointed to by POINTER_TO_CURRENT_GRAPHIC_ENTITY Set finished_evaluating_geometry_lod to FALSE Loop If GEOMETRY.GEOMETRY_TYPE is a circle bounding_box_width_pixels = GEOMETRY.Y2 *

DISPLAY_WIDTH_PIXELS_PER_IN

Set finished_evaluating_lod_for_current_geometry_component to FALSE

Set lod_counter to 1

Loop

Using the current value of lod_counter, determine the minimum %reduction from the LOD_TABLE.

Set lod_%reduction to the value from LOD_TABLE

/*Apply lod_%reduction to width of box, viz.

display_box_width_pixels = (1-lod_%reduction) * bounding_box_width_pixels

/*Since both the width and height of a circle's bounding box are the same, the width calculation is all that is required.

If GEOMETRY.LEVEL_OF_DETAIL has been determined for this component of the geometry Set finished_evaluating_lod_for_current_geometry_component to TRUE Else if display_box_width_pixels . NUMBER_PIXELS_REQUIRED_TO_DISPLAY_CIRCLE Set GEOMETRY.LEVEL_OF_DETAIL to lod_counter Set finished_evaluating_lod_for_current_geometry_component to TRUE Else if lod_counter < 5

Increment lod_counter by 1

Else

Set    GEOMETRY.LEVEL_OF_DETAIL to 6

/* This component will be displayed at the highest LOD

Set finished_evaluating_lod_for_current_geometry_component to TRUE

Until finished_evaluating_lod_for_current_geometry_component is TRUE

Else if GEOMETRY.GEOMETRY_TYPE is a line bounding_box_width_pixels = Absolute_Value(GEOMETRY.X1 - GEOMETRY.X2) *

DISPLAY_WIDTH_PIXELS_PER_IN bounding_box_height_pixels = Absolute_Value(GEOMETRY.Y1 - GEOMETRY.Y2) *

DISPLAY_HEIGHT_PIXELS_PER_IN

Set finished_evaluating_lod_for_current_geometry_component to FALSE

Set lod_counter to 1

Loop

Using the current value of lod_counter, determine the minimum %reduction from the

LOD_TABLE.

Set lod_%reduction to the value from LOD_TABLE

/*Apply lod_%reduction to width and height of box, viz.

display_box_width_pixels = (1-lod_%reduction) * bounding_box_width_pixels display_box_height_pixels = (1-lod_%reduction) * bounding_box_height_pixels If GEOMETRY.LEVEL_OF_DETAIL has been determined for this component of the geometry Set finished_evaluating_lod_for_current_geometry_component to TRUE Else if Maximum (display_box_width_pixels, display_box_height_pixels) >

NUMBER_PIXELS_REQUIRED_TO_DISPLAY_LINE

/* Draw the line if its longest dimension is significant

Set GEOMETRY.LEVEL_OF_DETAIL to lod_counter

Set finished_evaluating_lod_for_current_geometry_component to TRUE

Else if lod_counter < 5

Increment lod_counter by 1

Else

Set    GEOMETRY.LEVEL_OF_DETAIL to 6

/* This component will be displayed at the highest LOD

Set    finished_evaluating_lod_for_current_geometry_component to TRUE

Until finished_evaluating_lod_for_current_geometry_component is TRUE

Else

GEOMETRY.GEOMETRY_TYPE is an erroneous value.

Display the appropriate error message.

/* Use GEOMETRY.POINTER_TO_GEOMETRY to find the next geometry for the current device.

If GEOMETRY.POINTER_TO_GEOMETRY is NIL

Set finished_evaluating_geometry_lod to TRUE

Else

Set POINTER_TO_CURRENT_GRAPHIC_ENTITY_GEOMETRY to

GEOMETRY.POINTER_TO_GEOMETRY

36

Until finished_evaluating_geometry_lod is TRUE

/* At this point, a value for LOD has been assigned for each geometry component of the current graphic entity pointed to by POINTER_TO_CURRENT_GRAPHIC_ENTITY.

/* The geometry pointers should be ordered so that the components are ordered in ascending level of detail. This expedites display and causes largest components to be displayed first.

Return to calling routine

Function Name:   Determine_Device_Routable_Lines_LOD

Description:   Self Explanatory

Calling Routines:   Calculate_LOD_For_All_Graphics_Objects

Procedures Called:   Determine_Geometry_Entity_LOD

External Data Modified:   LOD for each component of the device routable lines geometry External Files: DEVICE_ROUTABLE_LINES, GEOMETRY Comments:   Routable lines are currently evaluated as individual lines. While this could be performed by a direct call to Determine_Geometry_Entity_LOD, the development of this procedure allows flexibility for future interpretations for routable lines.

PDL:

Determine_Geometry_Entity_LOD

Return to calling routine

Function Name: Determine_Schematic_Connector_LOD

Description: Self Explanatory

Calling Routines: Calculate_LOD_For_All_Graphics_Objects

Procedures Called: Determine_Geometry_Entity_LOD

External Data Modified: LOD for each component of the SCHEMATIC_CONNECTOR

External Files: SCHEMATIC_CONNECTOR, GEOMETRY

Comments: Connector geometries are currently evaluated as other geometries. This procedure provided flexibility for altering this evaluation.

PDL:

Determine_Geometry_Entity_LOD

Return to calling routine

Level of Display Real-Time Display Procedure

The objective of the level of display real-time display procedure is to determine, at display time, those graphic primitives of an entity which are to be displayed. This procedure is a component of a real-time display program. Its approach is that for a given Area of Interest (AOI) that is to be displayed, the system:
1. Computes the % reduction required to draw the AOI in the display window (viewport).
2. From the LOD_TABLE determines the proper LOD level (corresponding to the % reduction) at which to display AOI.
3. For each graphic primitive in each graphic entity in the AOI to be displayed:

Determines whether or not the LOD value of the graphics primitive is less than or equal to the LOD value at which to display the AOI.

If the LOD value of the graphic primitive is less than or equal to the LOD value for displaying the AOI:
        Determine appropriate attributes for each component (based on display LOD)
        Display the graphics primitive.
    ELSE do NOT display graphics primitive.

In detail, the LOD real-time display procedure includes the following global variables:
1. FONT_TABLE Size of font to display for a given font at a given LOD. If font size does not support display at a certain LOD, a zero entry in the table indicates that the font should NOT be displayed. The size values shown in the table are examples. Actual font size values are dependent on the display device resolution and must be determined experimentally based on user preferences and the physical limitations of the font being used. For example, the Font Table could be as follows:

| LOD | Font Size |
|-----|-----------|
| 1   | 0         |
| 2   | 0         |
| 3   | 6         |
| 4   | 8         |
| 5   | 10        |
| 6   | 11        |

Each of the following line tables are similar to the FONT_TABLE except they show the line size to be used for the line style (LineSolid, LineOnOffDash, LineDoubleDash) at each LOD. [A zero entry would indicate that the line should NOT be displayed.] These tables show the unreduced line length which reaches the corresponding LOD threshold after reduction. The smaller of the values from this table or the Schematic Data File are actually used to determine the line display. The size values shown in the table are examples. Actual line size values are dependent on the display device resolution and must be determined experimentally. Note that tables similar to these can be used to set LODs for other graphical primitive attributes.

| LOD | Line Size |
|-----|-----------|
| LineSolid_LINE_TABLE | |
| 1   | 60 |
| 2   | 30 |
| 3   | 20 |
| 4   | 14 |
| 5   | 10 |
| 6   | 7  |
| LineOnOffDash_LINE_TABLE | |
| 1   | 60 |
| 2   | 30 |
| 3   | 20 |
| 4   | 14 |
| 5   | 10 |
| 6   | 7  |
| LineDoubleDash_LINE_TABLE | |
| 1   | 60 |
| 2   | 30 |
| 3   | 20 |
| 4   | 14 |
| 5   | 10 |
| 6   | 7  |

2. FLOW_INDICATOR_TABLE Each entry in this table shows the line size to be used in drawing flow indicators for each LOD. [A zero entry indicates that the indicator should NOT be drawn.] This table shows the unreduced line length which reaches the corresponding LOD threshold after reduction. The smaller of the values from this table or the Schematic Data File are actually used to the line display. The size values shown in the table are examples. Actual line size values are dependent on the display device resolution and must be determined experimentally. Thus, the Flow Indicator Table could appear as follows:

| LOD | Line Size |
|-----|-----------|
| 1   | 60 |
| 2   | 30 |
| 3   | 20 |
| 4   | 14 |
| 5   | 10 |
| 6   | 7  |

3. LOD_FOR_DISPLAYING_GRAPHICS

Level of Detail at which graphics entities will be displayed.

The functions in the real-time display procedure are illustrated by the following:

Function Name: Draw_Graphics_Objects

Description: Draw each graphics entity at the appropriate level of detail

Procedures Called: Compute_%reduction, Draw Device_Fixed_Shapes,

Draw_Device_Routable_Lines, Draw_Schematic_Connector

Input Variable(s): DISPLAY_WIDTH_INCHES, DISPLAY_HEIGHT_INCHES

External Files: LOD_TABLE, DEVICE_FIXED_SHAPES, DEVICE_ROUTABLE_LINES,

SCHEMATIC_CONNECTOR

PDL:

/* Compute %reduction of AOI to DISPLAY_WIDTH_INCHES and

DISPLAY_HEIGHT_INCHES

Compute_%reduction

Set LOD_FOR_DISPLAYING_GRAPHICS to corresponding LOD from LOD_TABLE

For each DEVICE_FIXED_SHAPES

Draw_Device_Fixed_Shapes

For each DEVICE_ROUTABLE_LINES

Draw_Device_Routable_Lines

For each SCHEMATIC_CONNECTOR

Draw_Schematic_Connector

Return to calling routine

Function Name:   Draw_Device_Fixed_Shapes

Description:   Draw DEVICE_FIXED_SHAPES and display DEVICE_FIXED_

SHAPES.LABEL at the appropriate level of detail.

Calling Routines:  Draw_Graphics_Objects

Procedures Called:  Display_Graphic_Entity_Component

Internal Variable(s):  finished_displaying_current_graphic_entity_geometry, size_at_which_to_display_font External Files: DEVICE_FIXED_SHAPES, GEOMETRY, FONT_TABLE

PDL:

Set POINTER_TO_CURRENT_GRAPHIC_ENTITY_GEOMETRY to correct location in

GEOMETRY file for the current DEVICE_FIXED_SHAPES pointed to by

POINTER_TO_CURRENT_GRAPHIC_ENTITY

Set finished_displaying_current_graphic_entity_geometry to FALSE

/* Display geometry

Loop

If GEOMETRY.LEVEL_OF_DETAIL <= LOD_FOR_DISPLAYING_GRAPHICS

Display_Graphic_Entity_Component

Set POINTER_TO_CURRENT_GRAPHIC_ENTITY_GEOMETRY to

GEOMETRY.POINTER_TO_GEOMETRY

Else

Set finished_displaying_current_graphic_entity_geometry to TRUE

If POINTER_TO_CURRENT_GRAPHIC_ENTITY_GEOMETRY is NIL

Set finished_displaying_current_graphic_entity_geometry to TRUE

Until finished_displaying_current_graphic_entity_geometry is TRUE

/*Display DEVICE_FIXED_SHAPES.LABEL

Set size_at_which_to_display_font = FONT_TABLE.FONT_SIZE(LOD_FOR_

DISPLAYING_GRAPHICS )

IF size_at_which_to_display_font > 0

Display DEVICE_FIXED_SHAPES.LABEL

Return to calling routine

Function Name:   Draw_Device_Routable_Lines

Description:   Draw DEVICE_ROUTABLE_LINES and direction of flow indicator at the appropriate level of detail.

Calling Routines:   Draw_Graphics_Objects

Procedures Called:   Display_Graphic_Entity_Component,

Display_Device_Routable_Line_Flow_Direction

Internal Variable(s):   finished_displaying_current_graphic_entity_geometry

External Files: DEVICE_ROUTABLE_LINES, GEOMETRY, FONT_TABLE

PDL:

Set POINTER_TO_CURRENT_GRAPHIC_ENTITY_GEOMETRY to correct location in

GEOMETRY file for the current DEVICE_ROUTABLE_LINES pointed to by

POINTER_TO_CURRENT_GRAPHIC_ENTITY

Set finished_displaying_current_graphic_entity_geometry to FALSE

/* Display geometry

Loop

If GEOMETRY.LEVEL_OF_DETAIL <= LOD_FOR_DISPLAYING_GRAPHICS

Display_Graphic_Entity_Component

Set POINTER_TO_CURRENT_GRAPHIC_ENTITY_GEOMETRY to

GEOMETRY.POINTER_TO_GEOMETRY

Else

Set finished_displaying_current_graphic_entity_geometry to TRUE

If POINTER_TO_CURRENT_GRAPHIC_ENTITY_GEOMETRY is NIL

Set finished_displaying_current_graphic_entity_geometry to TRUE

Until finished_displaying_current_graphic_entity_geometry is TRUE

Display_Device_Routable_Line_Flow_Direction

Return to calling routine

Function Name:   Draw_Schematic_Connector

Description:   Draw SCHEMATIC_CONNECTOR at the appropriate level of detail.

Calling Routines:  Draw_Graphics_Objects

Procedures Called:   Display_Graphic_Entity_Component

Internal Variable(s):   finished_displaying_current_graphic_entity_geometry

External Files: GEOMETRY, FONT_TABLE

PDL:

Set POINTER_TO_CURRENT_GRAPHIC_ENTITY_GEOMETRY to correct location in

GEOMETRY file for the current SCHEMATIC_CONNECTOR pointed to by

POINTER_TO_CURRENT_GRAPHIC_ENTITY

Set finished_displaying_current_graphic_entity_geometry to FALSE

/* Display geometry

Loop

If GEOMETRY.LEVEL_OF_DETAIL <= LOD_FOR_DISPLAYING_GRAPHICS

Display_Graphic_Entity_Component

46

Set POINTER_TO_CURRENT_GRAPHIC_ENTITY_GEOMETRY to

GEOMETRY.POINTER_TO_GEOMETRY

Else

Set finished_displaying_current_graphic_entity_geometry to TRUE

If POINTER_TO_CURRENT_GRAPHIC_ENTITY_GEOMETRY is NIL

Set finished_displaying_current_graphic_entity_geometry to TRUE

Until finished_displaying_current_graphic_entity_geometry is TRUE

Return to calling routine

Function Name:   Display_Graphic_Entity_Component

Description:   The graphic entity in GEOMETRY pointed to by POINTER_TO_

CURRENT_GRAPHIC_ENTITY_GEOMETRY is displayed on screen using drawing instructions contained in the GEOMETRY record for the current graphic entity.

Calling Routines: Draw_Device_Fixed_Shapes, Draw_Device_Routable_Lines,

Draw_Schematic_Connector

Procedures Called:   X-windows windowing routines

Internal Variable(s):   width_at_which_line_will_be_drawn, style_in_which_line_will_be_drawn, line_size_from_appropriate_font_table External Files: GEOMETRY, FONT_TABLE, LineSolid_LINE_TABLE, LineOnOffDash_LINE_TABLE, LineDoubleDash_LINE_TABLE

PDL:

Set line_size_from_appropriate_font_table to

<line-style>_LINE_TABLE.LINE_SIZE(LOD_FOR_DISPLAYING_GRAPHICS where

<line-style> is LineSolid, LineOnOffDash, or LineDoubleDash.

Set width_at_which_line_will_be_drawn to "minimum"(GEOMETRY.LINE_WIDTH, line_size_from_appropriate_font_table)

/* Line widths are assumed to be "ordered" in ascending numerical order.

If GEOMETRY.GEOMETRY_TYPE is a line

Draw line using: coordinate, style, and color information found in GEOMETRY

LOD_FOR_DISPLAYING_GRAPHICS and width_at_which_line_will_be_drawn

If GEOMETRY.GEOMETRY_TYPE is a circle

Draw circle using: coordinate, style, and color information found in GEOMETRY

LOD_FOR_DISPLAYING_GRAPHICS, and width_at_which_line_will_be_drawn

Return to calling routine

Function Name: Compute_%reduction

Description: Compute % reduction from schematic to display device screen

Calling Routines: Draw_Graphics_Objects

Procedures Called: Maximum

Internal Variable(s): aoi_width_in, aoi_height_in, height_of_window_in, width_of_window_in, %_reduction_in_width, %_reduction_for_drawing External Data Modified: LOD_FOR_DISPLAYING_GRAPHICS External Files: AREA_OF_INTEREST, LOD_TABLE Assumptions: Schematic specification is in inches and window dimensions are in inches.

PDL:

Set aoi_width_in to the width of the AOI being displayed.

Set aoi_height_in to the height of the AOI being displayed.

/* For AOIs that are described in the AREA_OF_INTEREST file, use the width and height information found in that file. When AOI widen and narrow functions are applied, the height and width of the schematic area being displayed must be calculated.

Set width_of_window_in to the width, in inches, of the window in which the object is to be displayed.

Set height_of_window_in to the height, in inches, of the window in which the object is to be displayed.

%_reduction_in_width = width_of_window_in/ aoi_width_in * 100

%_reduction_in_height = height_of_window_in/ aoi_height_in * 100

%_reduction_for_drawing = Maximum(%_reduction_in_width, %_reduction_in_height)

Set LOD_FOR_DISPLAYING_GRAPHICS to the maximum LOD value from LOD_TABLE where %_reduction_for_drawing <= LOD_TABLE.%_REDUCTION Return to calling routine Function Name:   Display_Device_Routable_Line_Flow_Direction Description:   Display flow indicators for device_routable_lines Calling Routines: Draw_Device_Routable_Lines Internal Variable(s):   line_size_from_flow_indicator_table External Files: FLOW_INDICATOR_TABLE

PDL:

Set line_size_from_flow_indicator_table to FLOW_INDICATOR_TABLE(LOD_

FOR_DISPLAYING_GRAPHICS)

If line_size_from_flow_indicator_table > 0

Display flow indicator in "appropriate" position

Return to calling routine

Device Selection

As will become apparent, system 11 allows the user to select devices, lines, etc. on the displayed schematic for various reasons. For example, certain devices (a pump, for example) may have specifications, exploded views, or other additional information associated therewith which is not normally available on the base schematic. By selecting a displayed device and signalling a request for the additional information (by double-clicking, right-button clicking, etc.), the user can use system 11 to access such additional information as is available in the database for the selected device.

System 11 uses a procedure Determine_device_hit to decide whether a user's cursor selection is within or on a graphically portrayed device or not. The procedure uses a routine Convert_viewport_to_schematic_coordinates to translate from the display drawing area coordinates to the absolute data file coordinates which are the basis for all the acceptance or rejection calculations.

Several procedures are used by the Determine_device_hit procedure in specific graphic contexts. Determine_bounding_box_hit identifies all graphic objects whose bounding box encloses the user's cursor selection. Center_of_area_hit provides functionality to accept a center of mass cursor selection for any graphic object. Geometry_hit identifies a selected graphic object based on the selection of one of its graphic primitives. Line_hit selects a line graphic primitive by accepting any user cursor selection within an acceptance region of the line. Point_distance determines whether a user's cursor selection is within an acceptance region of a point. This supports the center of mass acceptance in Center_of_area_hit and Geometry_hit.

These routines are illustrated as follows:

| | | |
|---|---|---|
| Function Name: | Determine_device_hit | |
| Description: | This function will first determine if the location given is close enough to any device to count as a device hit if there is a device hit the function will determine which device is hit and will return a pointer to this device. | |
| Routines Called: | Determine_bounding_box_hit() | |
| | Center_of_area_hit() | |
| | Geometry_hit() | |
| Input Variable(s): | hit_location | coordinate_type |
| | | (hit location in viewport coordinates) |
| | device_hit_pointer | device_type pointer |
| Output Variable(s): | device_hit? | Boolean_type |
| Internal Variable(s): | abs_hit_location | coordinate_type |
| | | (hit location in absolute schematic coordinates) |
| | best_hit_value | long int |
| | center_hit_value | long int |

|  |  |
|---|---|
| geometry_hit_value | long int |
| not_finished | Boolean type |
| current_device | device_type pointer |

Class Data Used:   head_schematic_memory_file_data_pointer, schematic_data_type pointer Class Data Modified: none Global Data Used:   none Global Data Modified:   none Assumptions:   The hit location coordinates passed to this function are in viewport coordinates so they be converted into absolute schematic coordinates so they can be compared to schematics.

Comments:   none

PDL:

device hit pointer = NULL not_finished = TRUE best hit value = 30000 device hit? = FALSE current_device = head_schematic_memory_file_data_pointer -> (schematic_pointer -> schematic_device_pointer)

Convert_viewport_to_schematic_coordinates( hit_location, abs_hit_location)

while (not_finished == TRUE )

if (Determine bounding box hit(abs_hit_location, current_device->bounding_up_left, current_device->bounding_lower_right) is TRUE)

switch on current_device->device_class fixed shape:

if (center of area hit (current_device, abs_hit_location, center hit value) is TRUE)

```
                    if (center hit value < best hit value)
                            device_hit_pointer = current_device
                            best hit value = center hit value
                            device hit? = TRUE
                    end if
                    if (geometry hit (current_device, abs_hit_location,
geometry hit value) is TRUE)
                            if (geometry hit value < best hit value)
                                    device_hit_pointer = current_device
                                    best hit value = geometry hit value
                                    device hit? = TRUE
                            end if
            end case
            routable line:
                    if (geometry hit (current_device, abs_hit_location,
geometry hit value) is TRUE)
                            if (geometry hit value < best hit value)
                                    device hit pointer = current device
                                    best hit value = geometry hit value
                                    device hit? = TRUE
                            end if
                            hit value = geometry hit value
            end case
        end switch
    end if  - bounding box
    if (current_device -> device_pointer == NULL)  no more devices
        not_finished = FALSE
``` else current_device = current_device -> device_pointer end loop return device hit?

| | |
|---|---|
| Function Name: | Convert_viewport_to_schematic_coordinates |
| Description: | This function does the conversion from viewport coordinates and absolute schematic coordinates |
| Calling Routines: | Determine_device_hit() |
| Routines Called: | none |
| Input Variable(s): | point      coordinate_type |
| Output Variable(s): | none |
| Internal Variable(s): | resize_value      integer |
| Class Data Used: | the_aoi      aoi_obj pointer |
| Class Data Modified: | none |
| Global Data Used: | none |
| Global Data Modified: | none |
| Assumptions: | none |
| Comments: | May need to take into account offset values that point to point are changed |

PDL:

Get resize value undo resize

| | |
|---|---|
| Function Name: | Determine_bounding_box_hit |
| Description: | this function determines if a given hit falls within the given bounding box if the point | falls within the bounding box the function
returns true otherwise it returns false

| | |
|---|---|
| Calling Routines: | Determine_device_hit() |
| | Line_hit() |
| Routines Called: | none |
| Input Variable(s): | hit_point         coordinate type |
| | upper_left_point  coordinate type |
| | lower_right_point coordinate type |
| Output Variable(s): | bounding_box_hit? Boolean type |
| Internal Variable(s): | y_hit?  Boolean type |
| | x_hit?  Boolean type |
| Class Data Used: | none |
| Class Data Modified: | none |
| Global Data Used: | none |
| Global Data Modified: | none |
| Assumptions: | all coordinates are in same system |
| Comments: | none |

PDL:

bounding box hit? = FALSE if (hit point y >= y lower right) and (hit point y <= y upper left) then y hit? is TRUE if (hit point x >= x upper left) and (hit point x <= x lower right) then x hit? is TRUE if (x hit? is TRUE and y hit? is TRUE) then bounding box hit? is TRUE return bounding box hit?

| | |
|---|---|
| Function Name: | Center_of_area_hit |
| Description: | this function will return true if the hit point is within a radius of the center of mass. So if user clicks on the center of a fixed shape it will return a hit. |
| Calling Routines: | Determine_device_hit() |
| Routines Called: | Point_distance() |
| Input Variable(s): | device     device_type pointer |
| | hit_point     coordinate type |
| | hit_value     pointer to int |
| Output Variable(s): | device_hit?     Boolean type |
| Internal Variable(s): | distance     integer |
| Class Data Used: | none |
| Class Data Modified: | none |
| Global Data Used: | none |
| Global Data Modified: | none |
| Assumptions: | hit point coordinates are in schematic coordinates |
| Comments: | none |

PDL:

```
    distance = Point_distance(device->center point , hit point)
if (distance < device->area_radius)
    device hit? is TRUE
else
    device hit? is FALSE
hit value = distance
return device hit?
```

| | |
|---|---|
| Function Name: | Geometry_hit |
| Description: | this function will look at all geometry for a device and see if the hit point is close enough to any of the primitives to count as a hit. If any of the primitives are hit it will return it. In the case of multiple hits the closest hit is returned. |
| Calling Routines: | Determine_device_hit() |
| Routines Called: | Point_distance() |
| Input Variable(s): | device            device_type pointer |
| | hit_point          coordinate type |
| | hit_value          pointer to int |
| Output Variable(s): | geometry_hit?      Boolean_type |
| Internal Variable(s): | not_finished       Boolean_type |
| | distance           integer |
| | delta              integer |
| | best_hit_value     integer |
| | current_geometry     geometry_data_type pointer |
| Class Data used: | none |
| Class Data Modified: | none |
| Global variable used: | Tolerance          constant integer |
| Global Variable Modified: | none |
| Assumptions: | 1. hit point coordinates are in schematic coordinate system |
| | 2. That TOLERANCE will never be 32,000 or larger |
| Comments: | none |
| PDL: | | geometry hit? is FALSE

```
not_finished = TRUE current_geometry = device -> geometry_pointer best hit value = 31000 while ( not_finished == TRUE )

switch on current_geometry ->geometry_primative circle:

distance = Point_distance( current_geometry -> center point, hit point)
    // center point and radius are pre computed and stored delta = abs( radius - distance)

if (delta < tolerance) then geometry hit? is TRUE if (distance < best hit value)

best hit value = distance end if end case line:

if (line hit( hit point, current_geometry -> point1, current_geometry -> point2, line hit value) is TRUE) then geometry hit? is TRUE if (line hit value < best hit value ) then best hit value = line hit value end if end case end switch if (current_geometry -> geometry_pointer == NULL)  no more geometry
```

```
                    not_finished = FALSE
        else
                    current_geometry = current_geometry -> geometry_pointer
    end loop
    return geometry hit?
```

| | | |
|---|---|---|
| Function Name: | Line_hit | |
| Description: | This function determines if a hit is close enough to a line segment for it to be considered a hit. | |
| Calling Routines: | Geometry_hit | |
| Routines Called: | Determine_bounding_box_hit | |
| Input Variable(s): | hit_point | coordinate type |
| | line_point_one | coordinate type |
| | line_point_two | coordinate type |
| | hit_value | integer pointer |
| Output Variable(s): | line_hit? | Boolean type |
| Internal Variable(s): | upper_left | coordinate type |
| | lower_right | coordinate type |
| | temp1 | float |
| | temp2 | float |
| | temp3 | float |
| | numerator | float |
| Class Data Used: | none | |
| Class Data Modified: | none | |
| Global Data Used: | Tolerance | constant integer |
| Global Data Modified: | none | |
| Assumptions: | All coordinates are in same coordinate system | |

Comments: If hit location is close enough then TRUE is returned otherwise FALSE is returned

PDL:

```
line hit? is FALSE
find upper left point of line box
find lower right point of line box
upper left x = upper left x - tolerance
upper left y = upper left y + tolerance
lower right x = lower right x + tolerance
lower right y = lower right y + tolerance
if (Determine_bounding_box_hit( hit point, upper left, lower right) is TRUE)
        temp1 = hit_point x * ( zero y - one y )
        temp2 = hit_point y * (one x - zero x)
        temp3 = zero x * one y - zero y * one x
        numerator=temp1+temp2+temp3
        if (norm_lenth==0)
                norm_length = 1e-20
        distance = abs(numerator / norm_length)     //norm length is pre computed and stored
                if (distance < tolerance ) then
                        line hit? is TRUE
                        hit value = distance
                end if
        end if
        return line hit?
```

| | | |
|---|---|---|
| Function Name: | Point_distance | |
| Description: | This function computes the distance between two points | |
| Calling Routines: | Center_of_area_hit(), Geometry_hit() | |
| Routines Called: | none | |
| Input Variable(s): | point_one | coordinate type |
| | point_two | coordinate type |
| Output Variable(s): | distance | int |
| Internal Variable(s): | xsquare | float |
| | ysquare | float |
| Class Data Used: | none | |
| Class Data Modified: | none | |
| Global Data Used: | none | |
| Global Data Modified: | none | |
| Assumptions: | two points are in same coordinate system | |
| Comments: | none | |

PDL:

xsquare = square (point one x - point two x)

ysquare = square (point one y - point two y)

distance = sqrt(xsquare + ysquare)

return distance

Centering of Display

During use of schematic display system 11, the user may request a change in the scale of the display, which automatically includes a change in the level of detail of the display. During such changes, it is preferred that the center of view on the schematic not change as the scale is changed. This is accomplished by a pair of procedures Correct_aoi_origin_on_narrow and Correct_aoi-origin_on_widen, which adjust the origin of the user interface viewport 21 so that the center of the viewport remains fixed while the displayed graphics are resized larger or smaller. Correct_aoi_origin_on_narrow increases the size of the drawing area and causes the center of the viewport to drift away from the viewport origin (upper left comer) down and to the right. The procedure corrects this by moving the viewport origin down and to the right so the viewport center appears to be motionless. This procedure also contains an additional small correction factor pair to compensate for rounding errors inherent in the specific processor, the operating system tools and the compiler used. Correct_aoi_origin_on_widen functions in a similar fashion compensating for the shrinking of the drawing area by moving the viewport origin up and to the left so that the viewport center appears to remain motionless.

These procedures are illustrated by the following:

```
Function Name:      Correct_aoi_origin_on_narrow
Description:        This subroutine is responsible for calculating the
                    new x and y coordinates of the viewing window for
                    narrowing.
Calling Routines:   The User Interface module 23
Routines Called:    none
Input Variables:    io_x_coord_ptr     int pointer
                    io_y_coord_ptr     int pointer
                    stretch_schematic  double
Output Variables:   io_x_coord_ptr     int pointer
                    io_y_coord_ptr     int pointer
Internal Variables: resize_value - the resize value at which the
          schematic is currently being drawn,
                    aoi_data - pertinent current aoi information held in
                    the class,
                    schematic_height - actual schematic height held in
                    class,
                    schematic_width - actual schematic width held in
                    the class.
External Data Modified: none
External Files: none
Assumptions: self-explanatory
Comments: none
Procedure:
get view port dimensions in pixels
compute the viewport center
compute the resized value of the viewport dimensions (resize the scroll bar
values)
compute the resize_offset for the viewport origin to leave the viewport
center stationary this includes a rounding correction factor
apply the resize_offset to the viewport origin
Function Name:      Correct_aoi_origin_on_widen
Description:        This subroutine is responsible for calculating the
                    new x and y coordinates of the viewing window for
                    widening.
Calling Routines:   The USER INTERFACE module 23
Routines Called:    none
Input Variables:    io_x_coord_ptr     int pointer
                    io_y_coord_ptr     int pointer
                    stretch_schematic  double
Output Variables:   io_x_coord_ptr     int pointer
                    io_y_coord_ptr     int pointer
Internal Variables: resize_value - the resize value the schematic is
          currently being drawn,
                    aoi_data - pertinent current aoi information held in
                    the class,
                    schematic_height - actual schematic height held in
                    class,
                    schematic_width - actual schematic width held in
                    the class.
External Data Modified: none
External Files: none
Assumptions: self-explanatory
Comments: none
Procedure:
get view port dimensions in pixels
compute the viewport center
compute the resized value of the viewport dimensions (resize the scroll bar
values)
compute the resize_offset for the viewport origin to leave the viewport
center stationary this includes a rounding correction factor
apply the resize_offset to the viewport origin
```

Description of Operation of Real Time Schematic Display

Figure 5A:
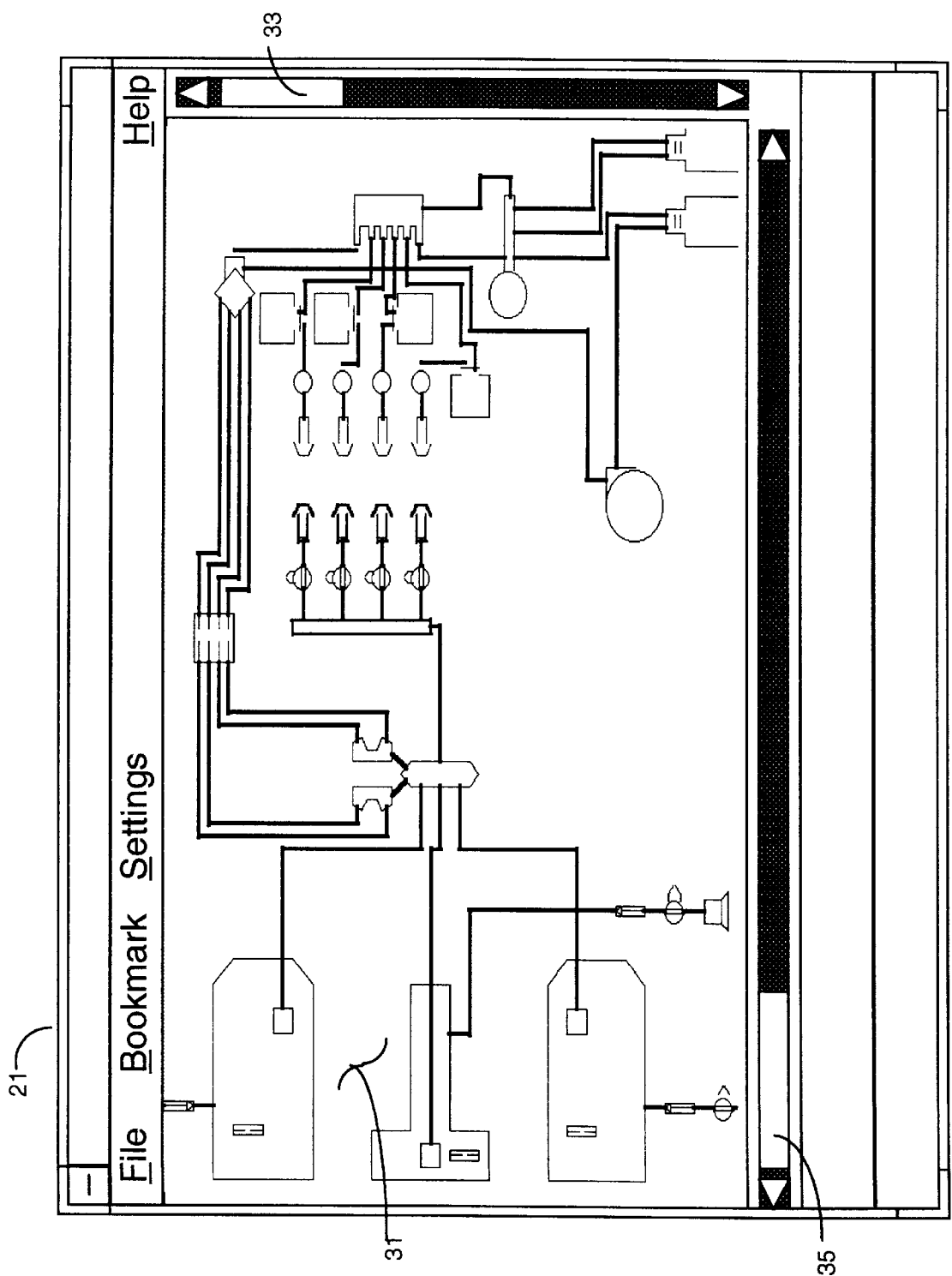
FIGS. 5A–5Q are illustrative screens of the schematic display system of FIG. 1.
Figure 5B:
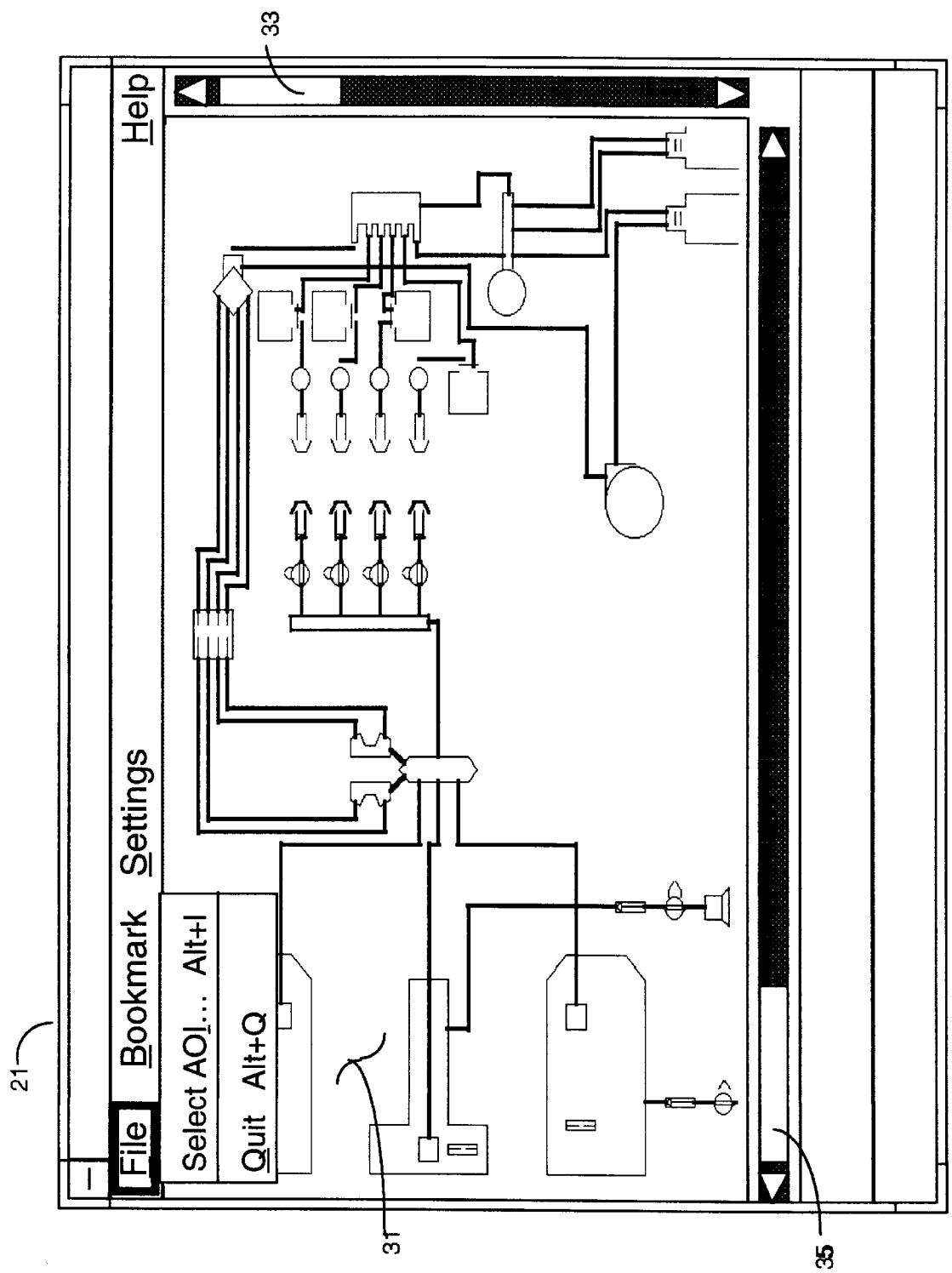
Figure 5C:
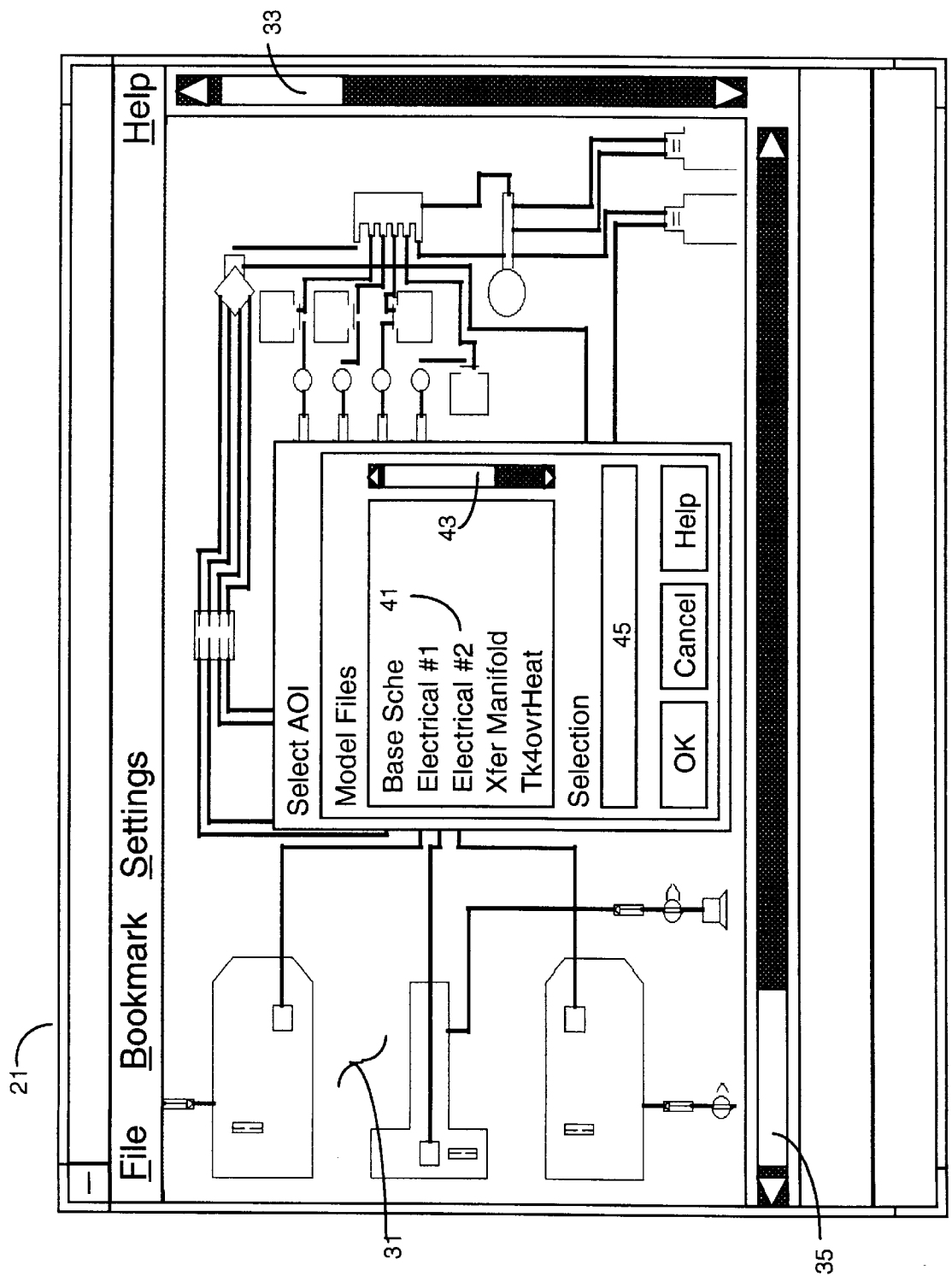
Figure 5D:
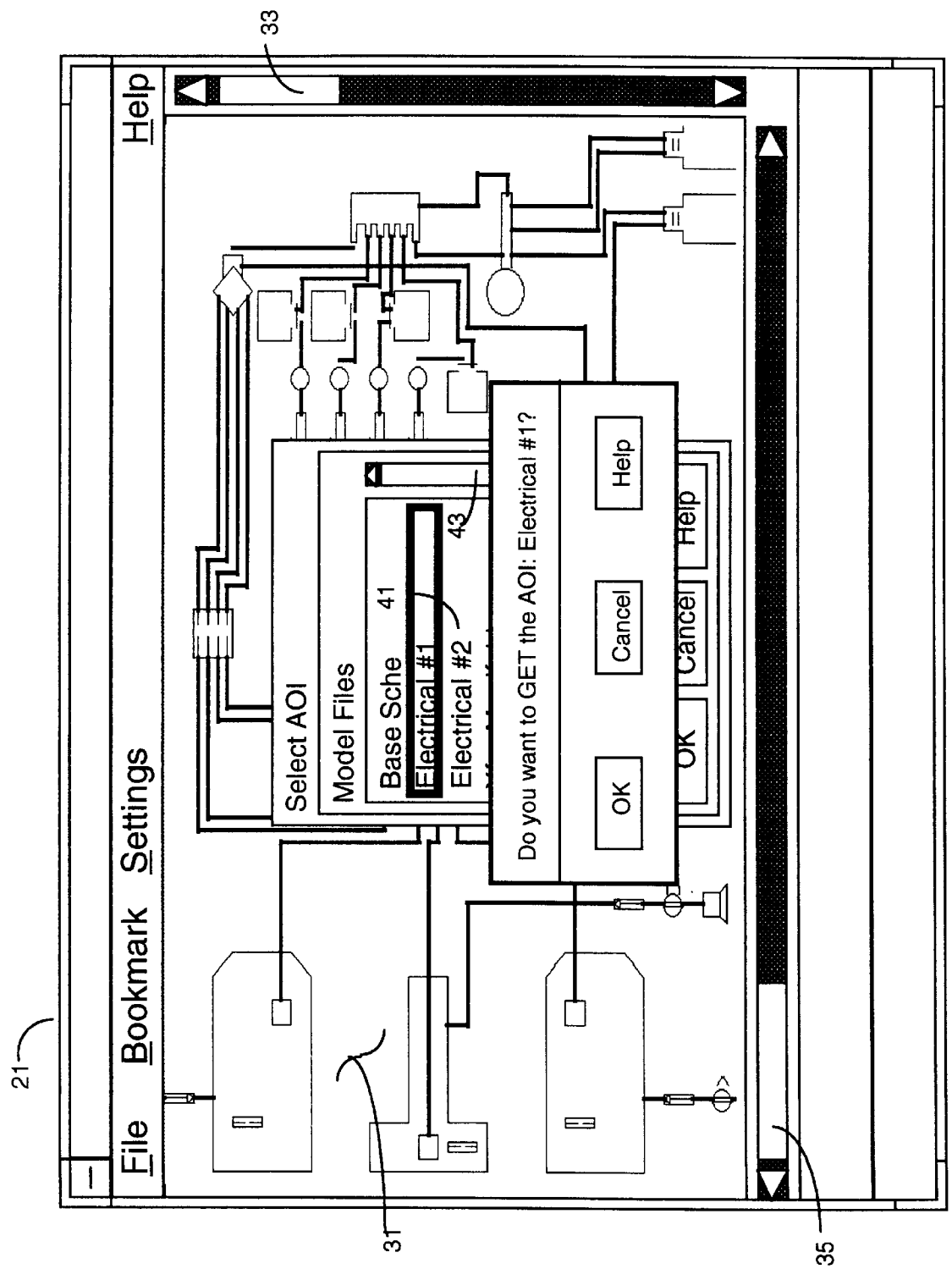
Figure 5E:
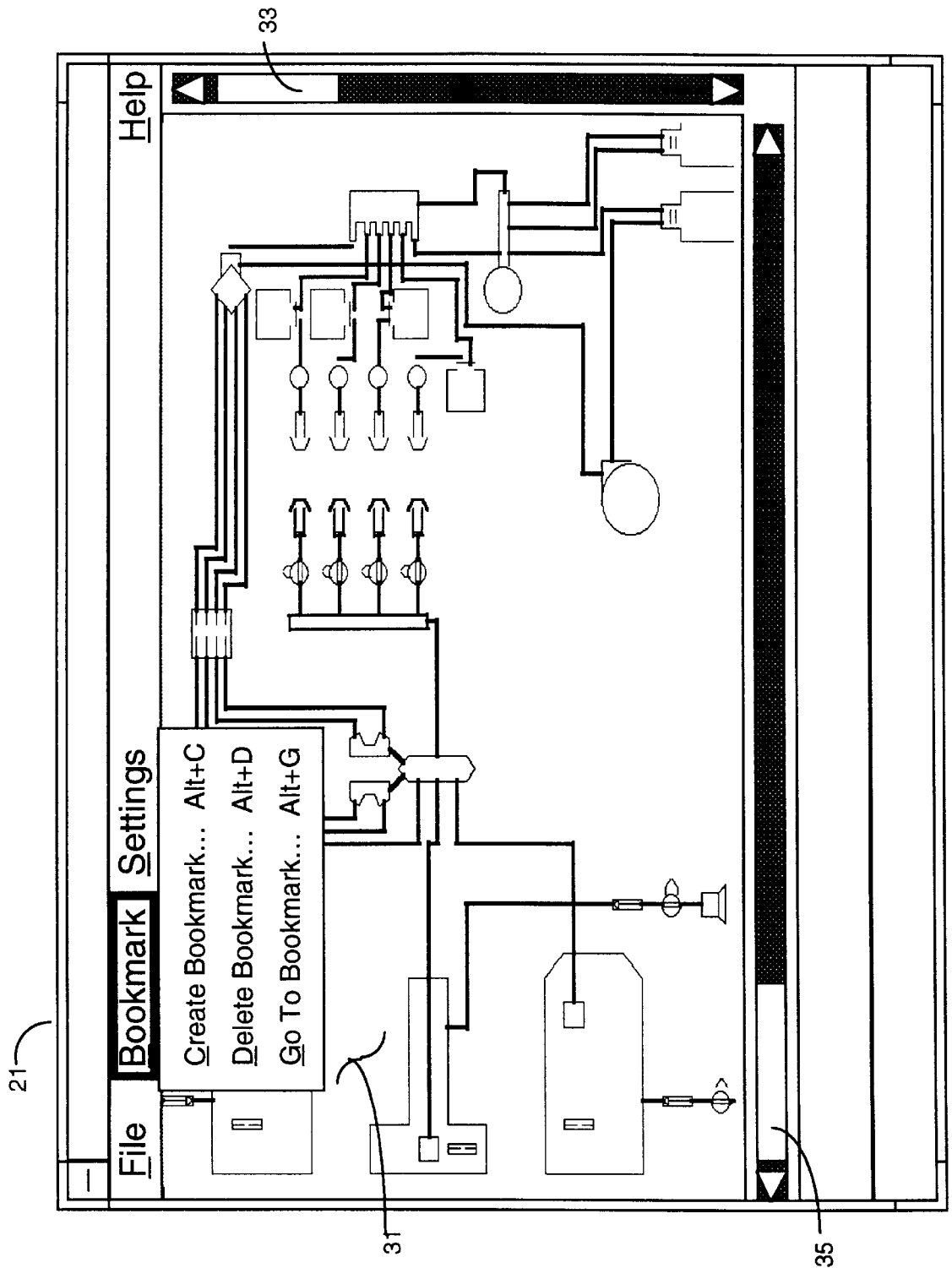
Figure 5F:
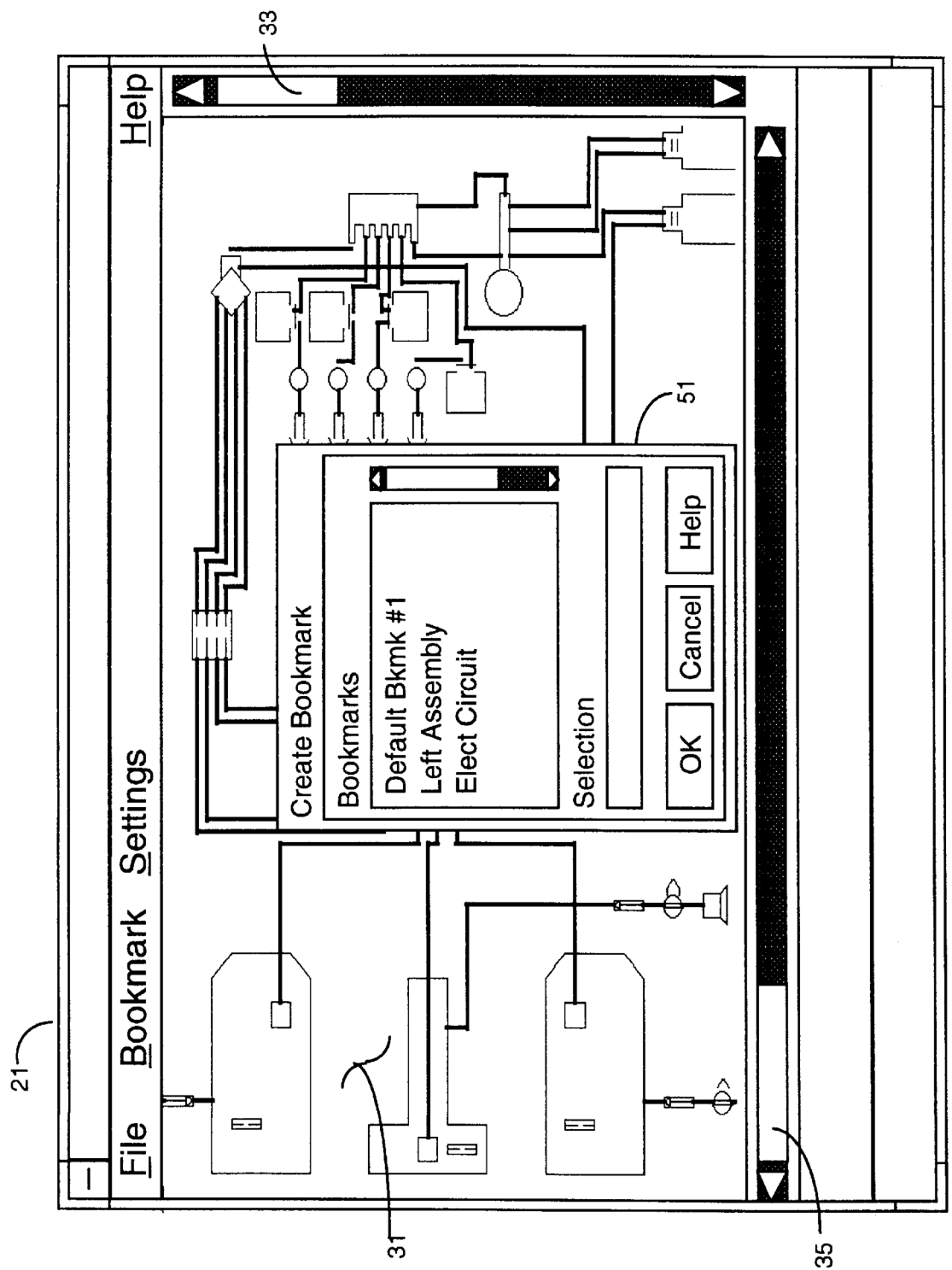
Figure 5G:
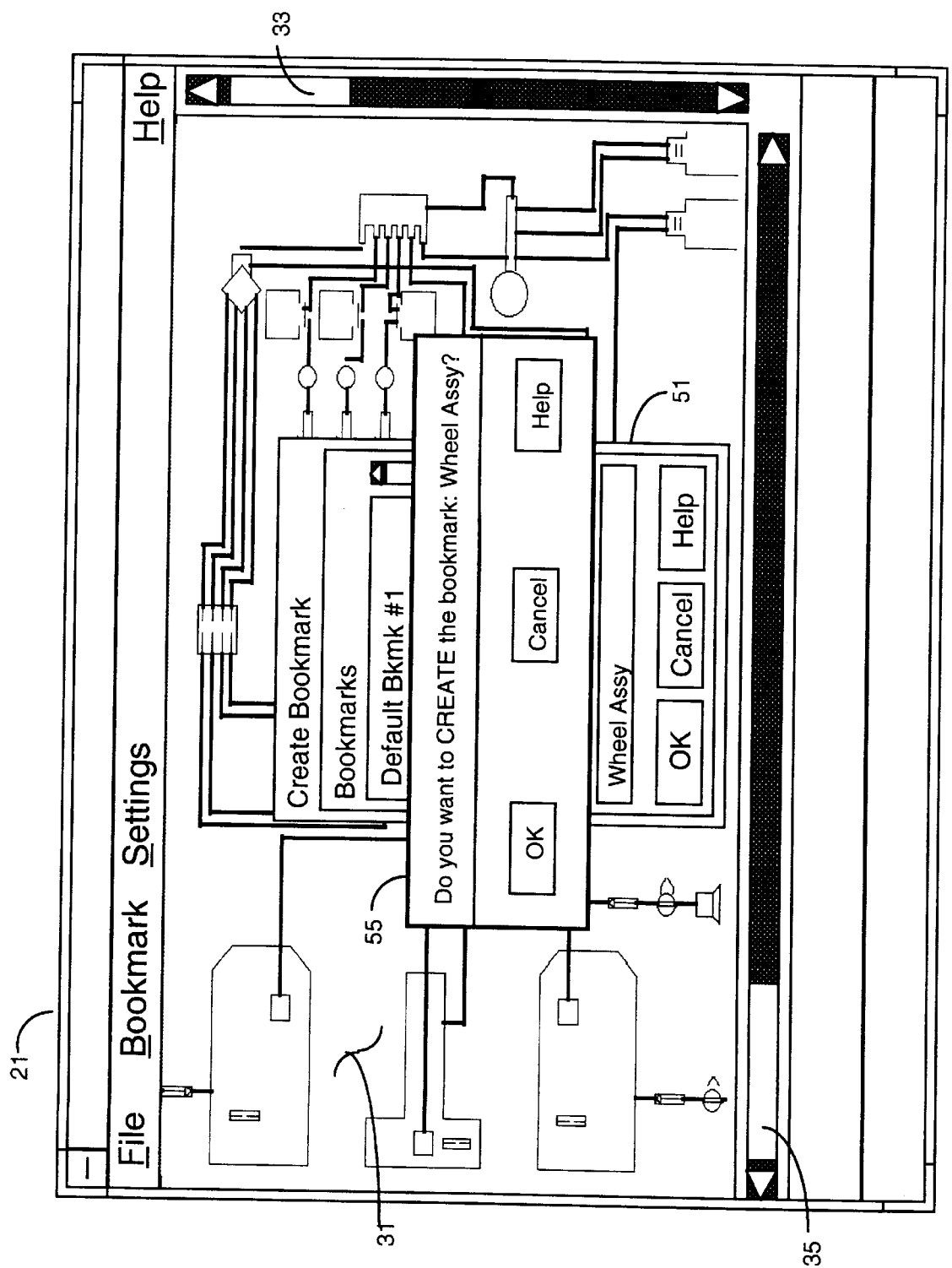
Figure 5H:
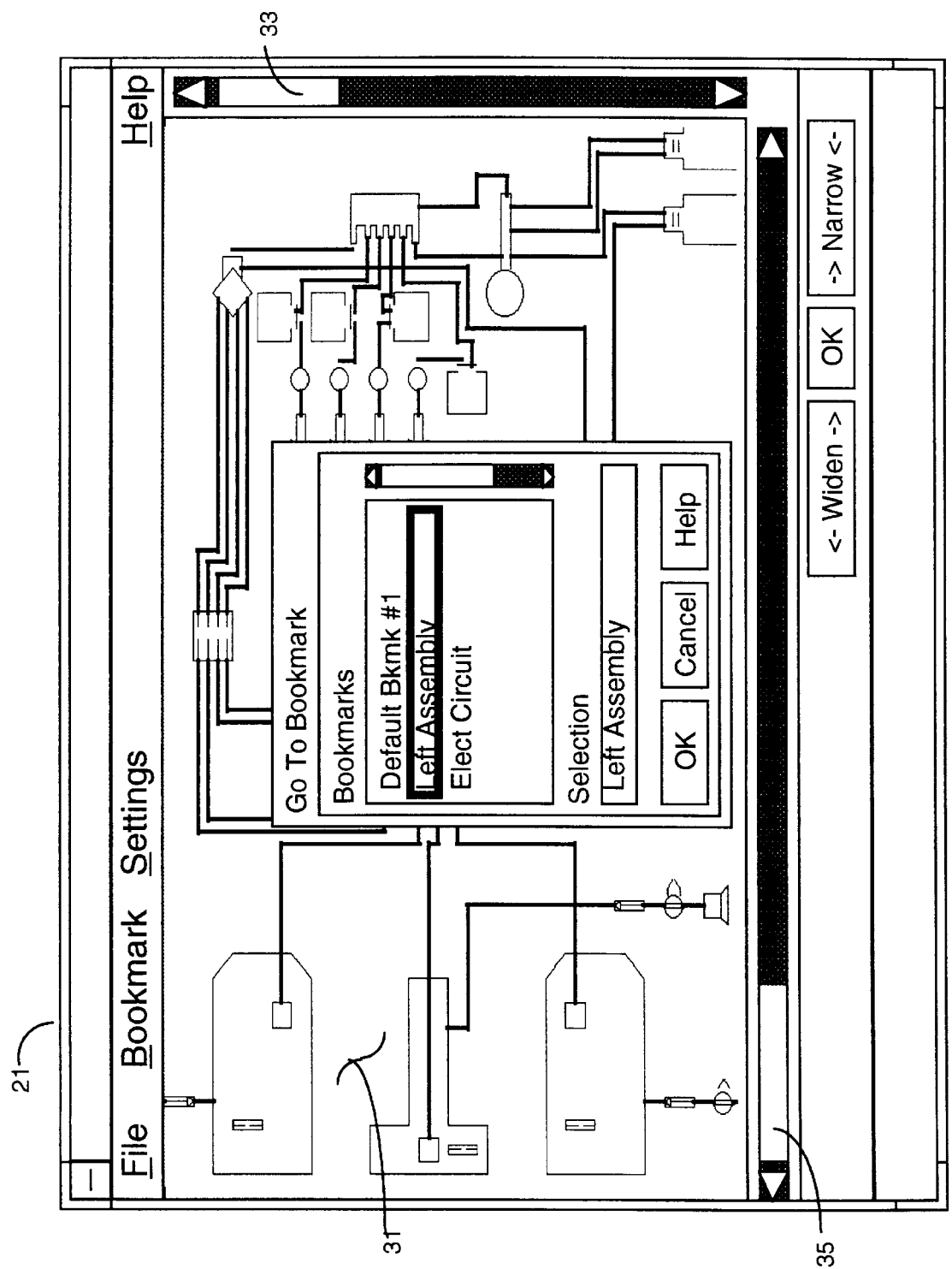
Figure 5I:
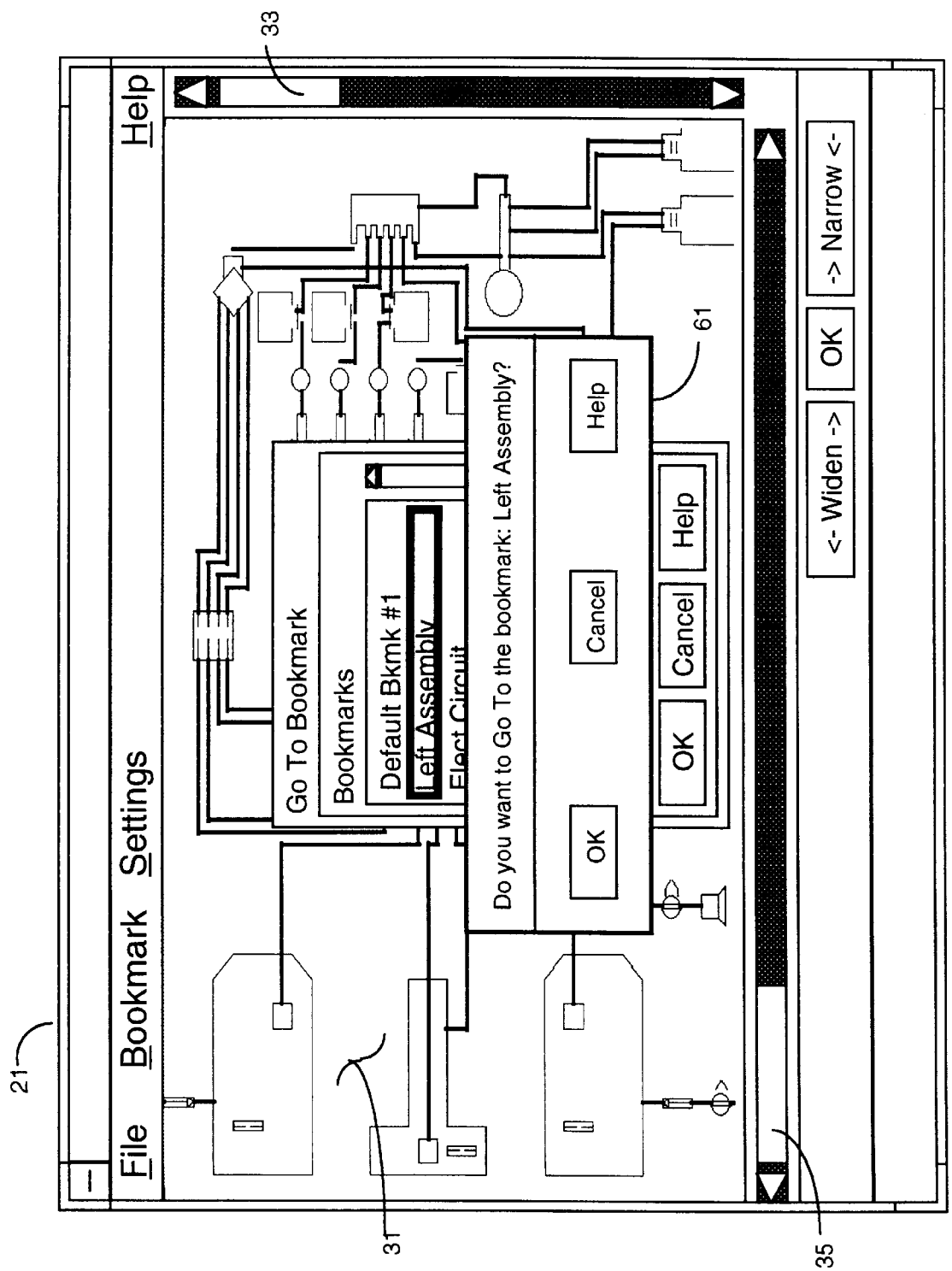
Figure 5J:
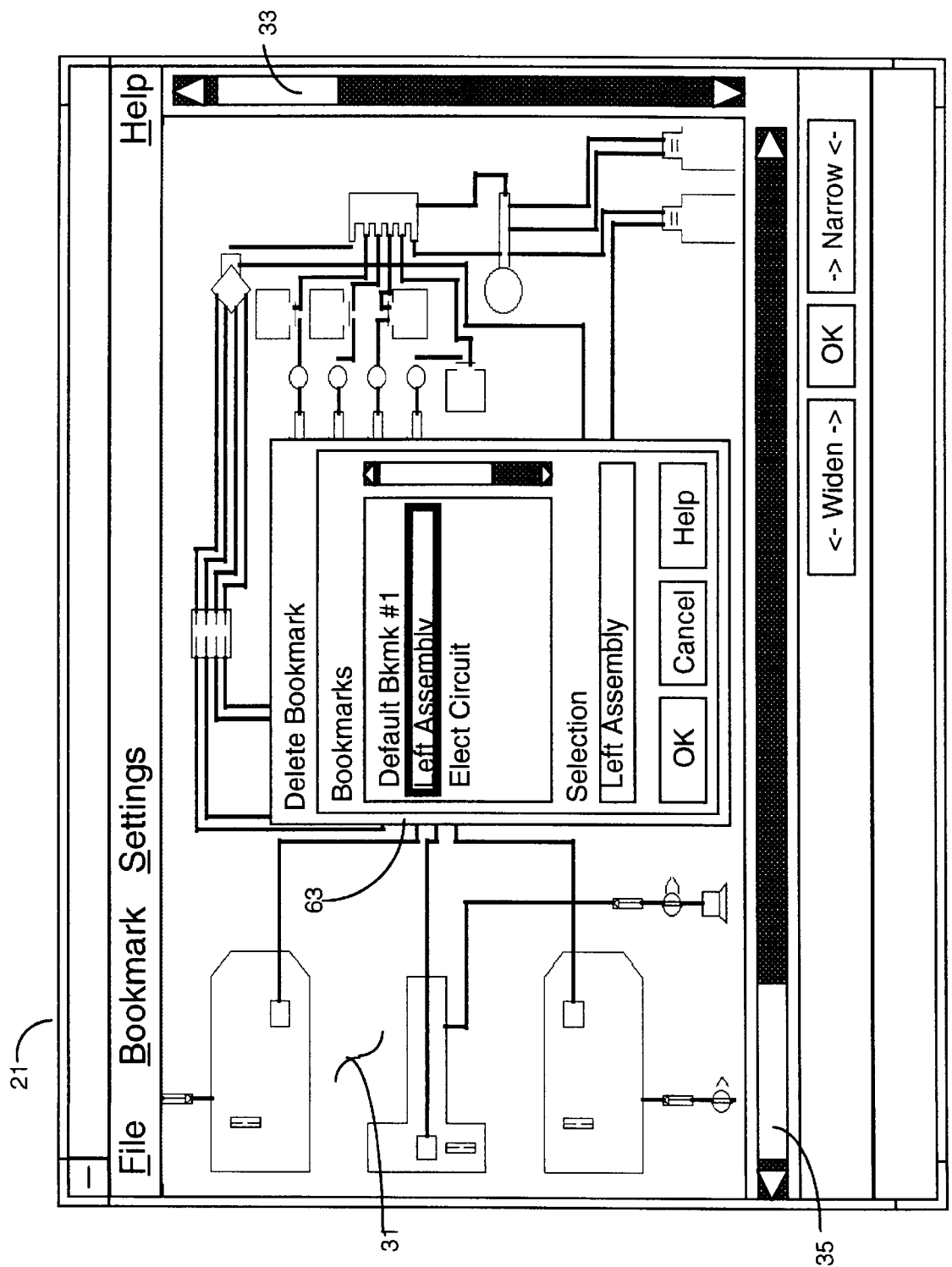
Figure 5K:
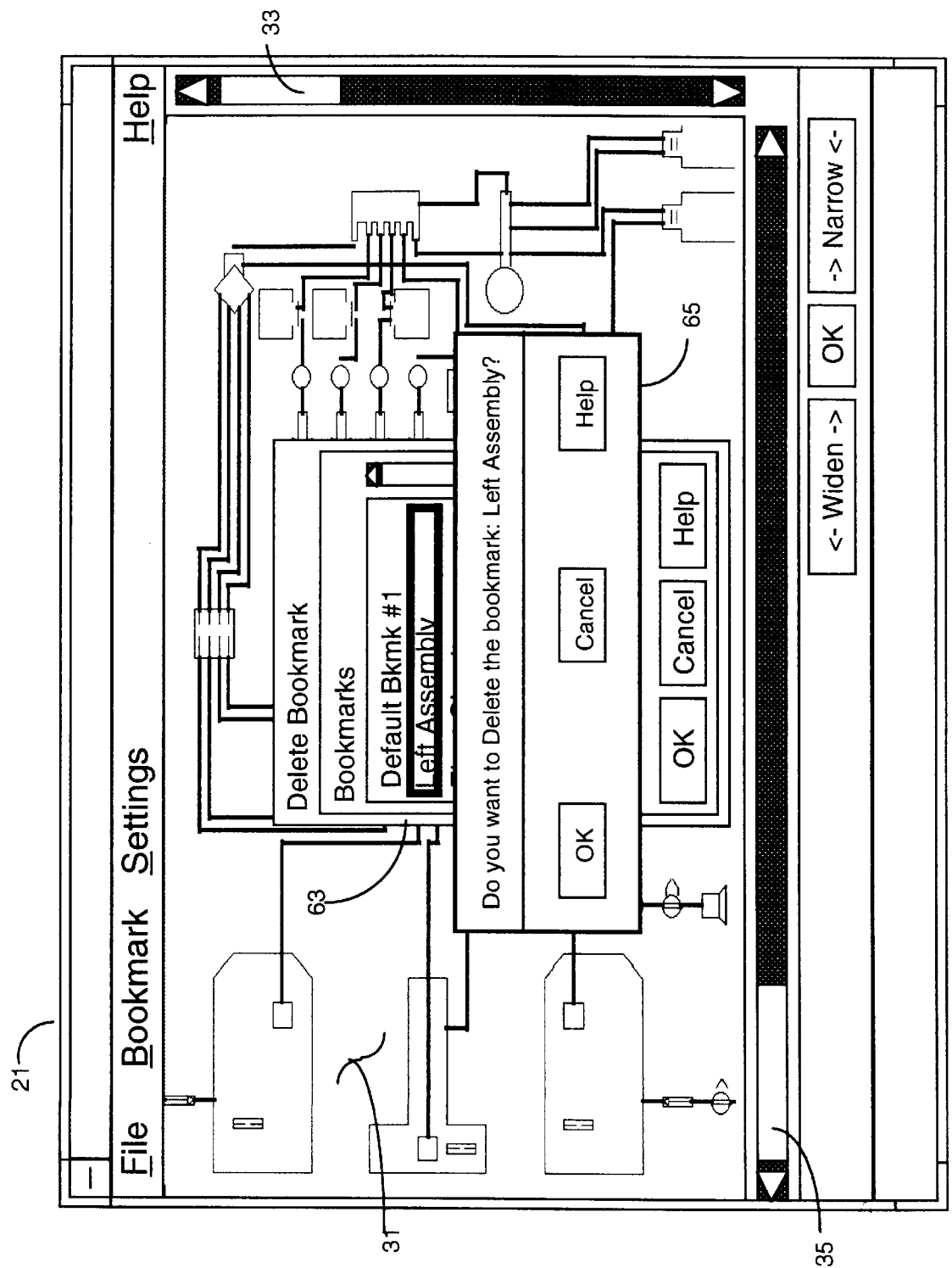
Figure 5L:
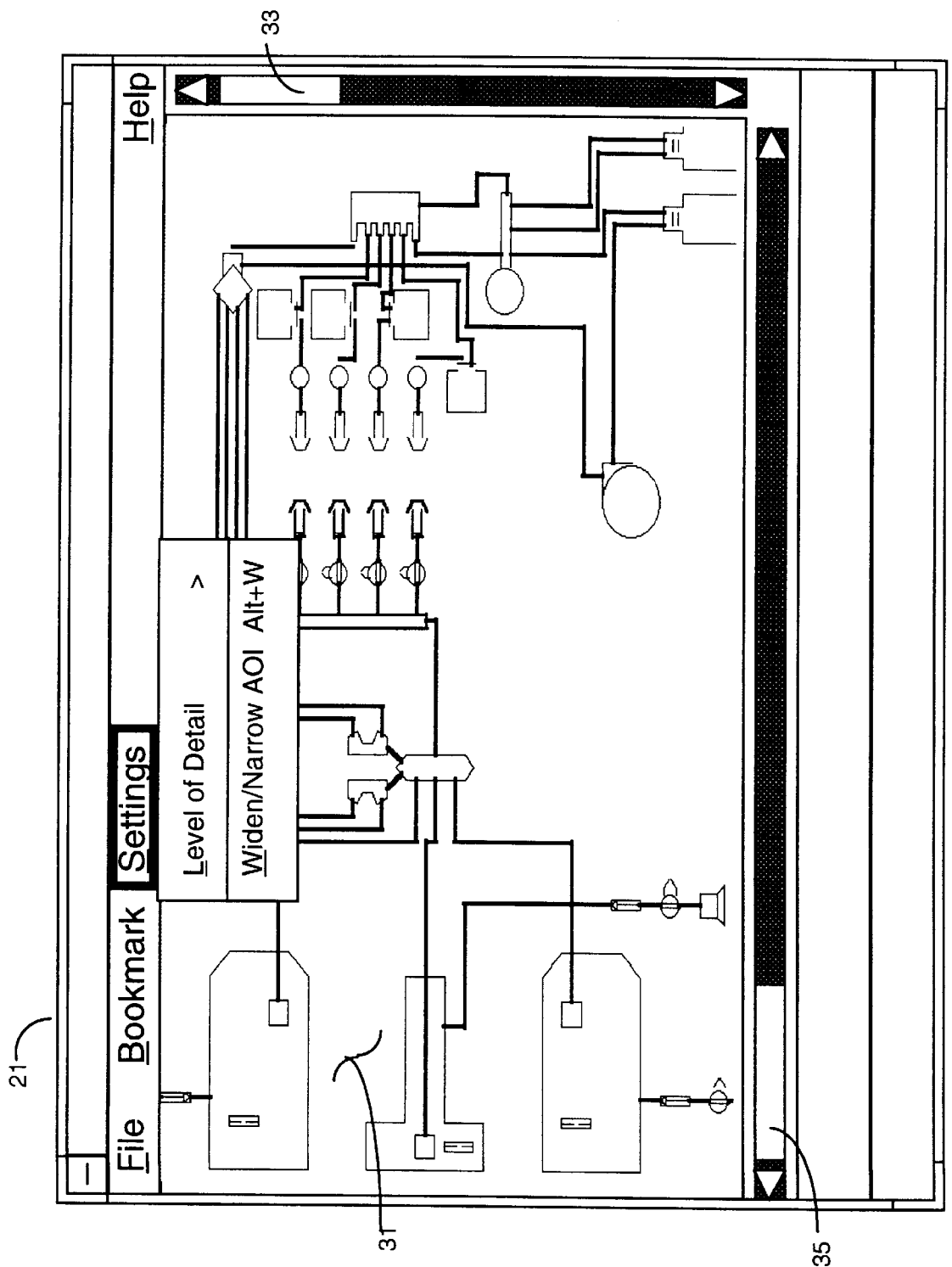
Figure 5M:
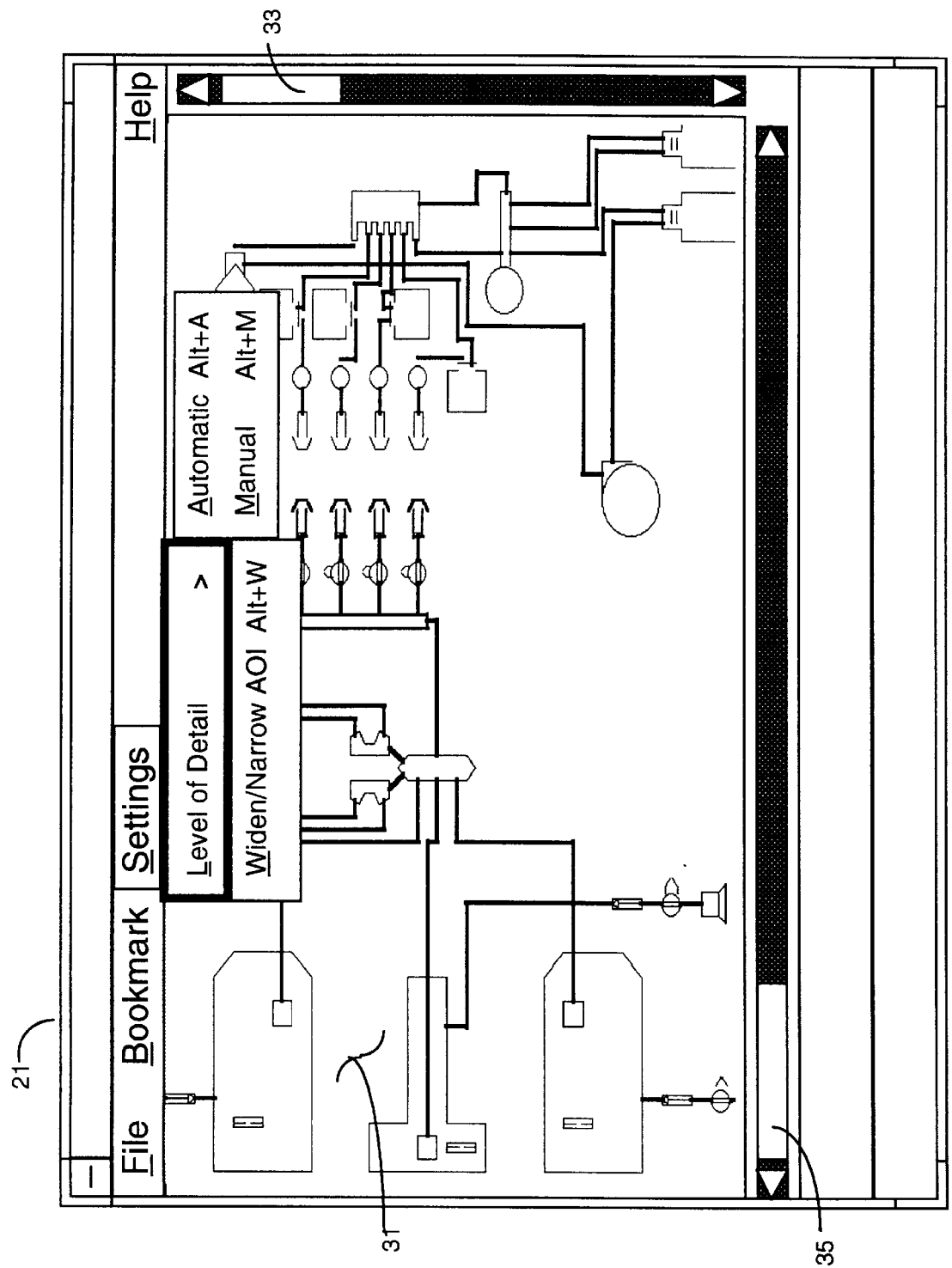
Figure 5N:
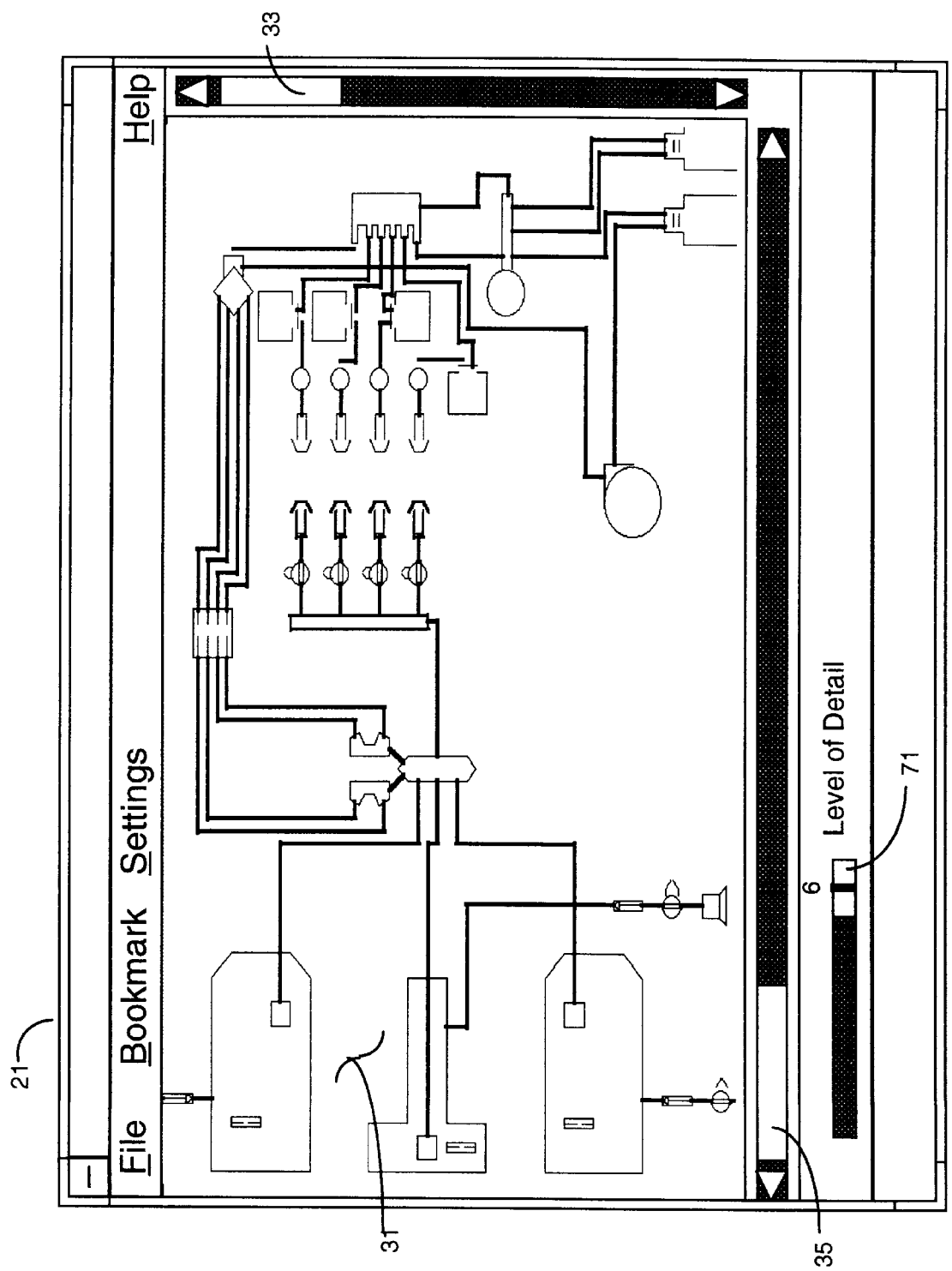
Figure 5O:
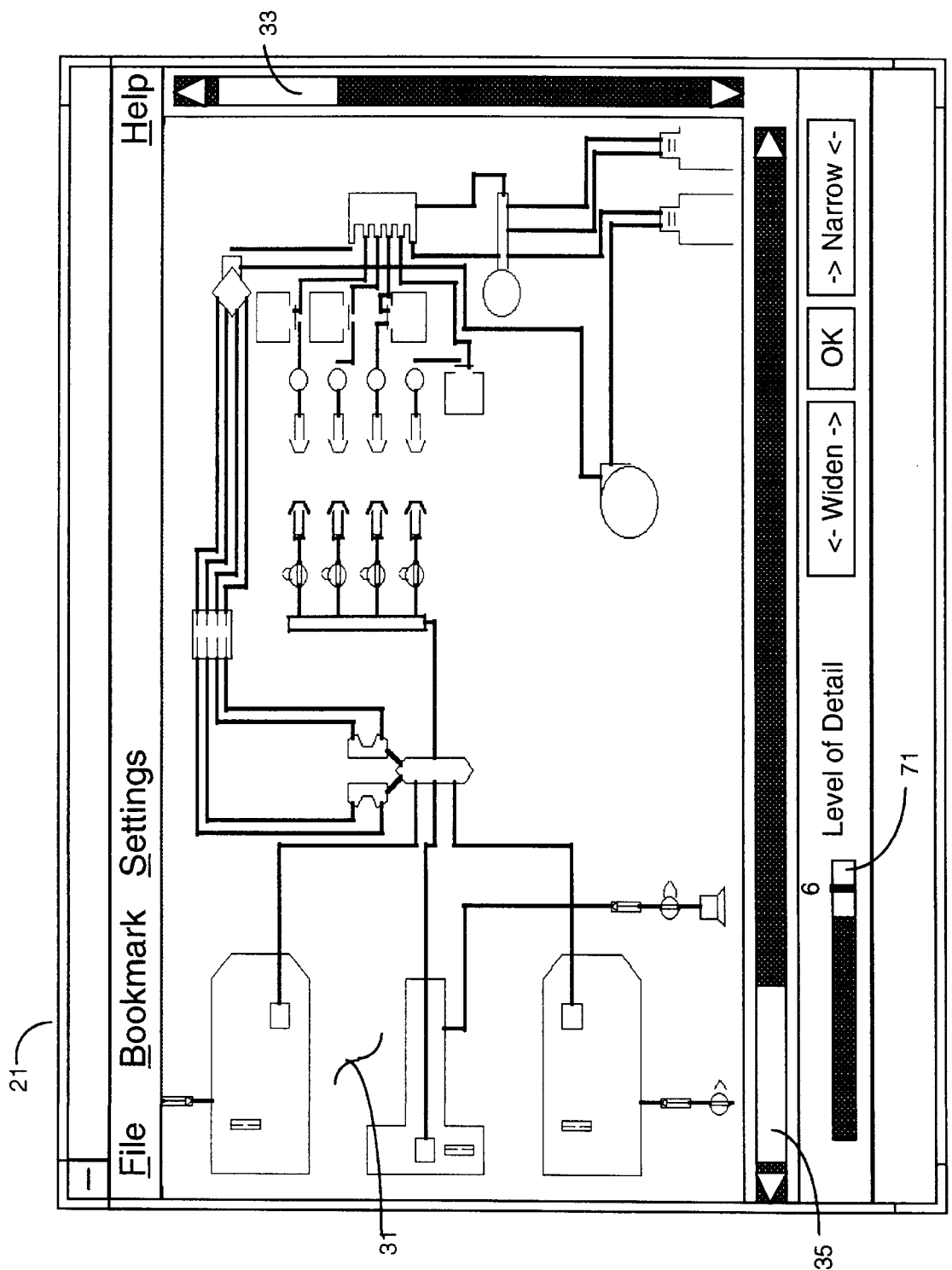
Figure 5P:
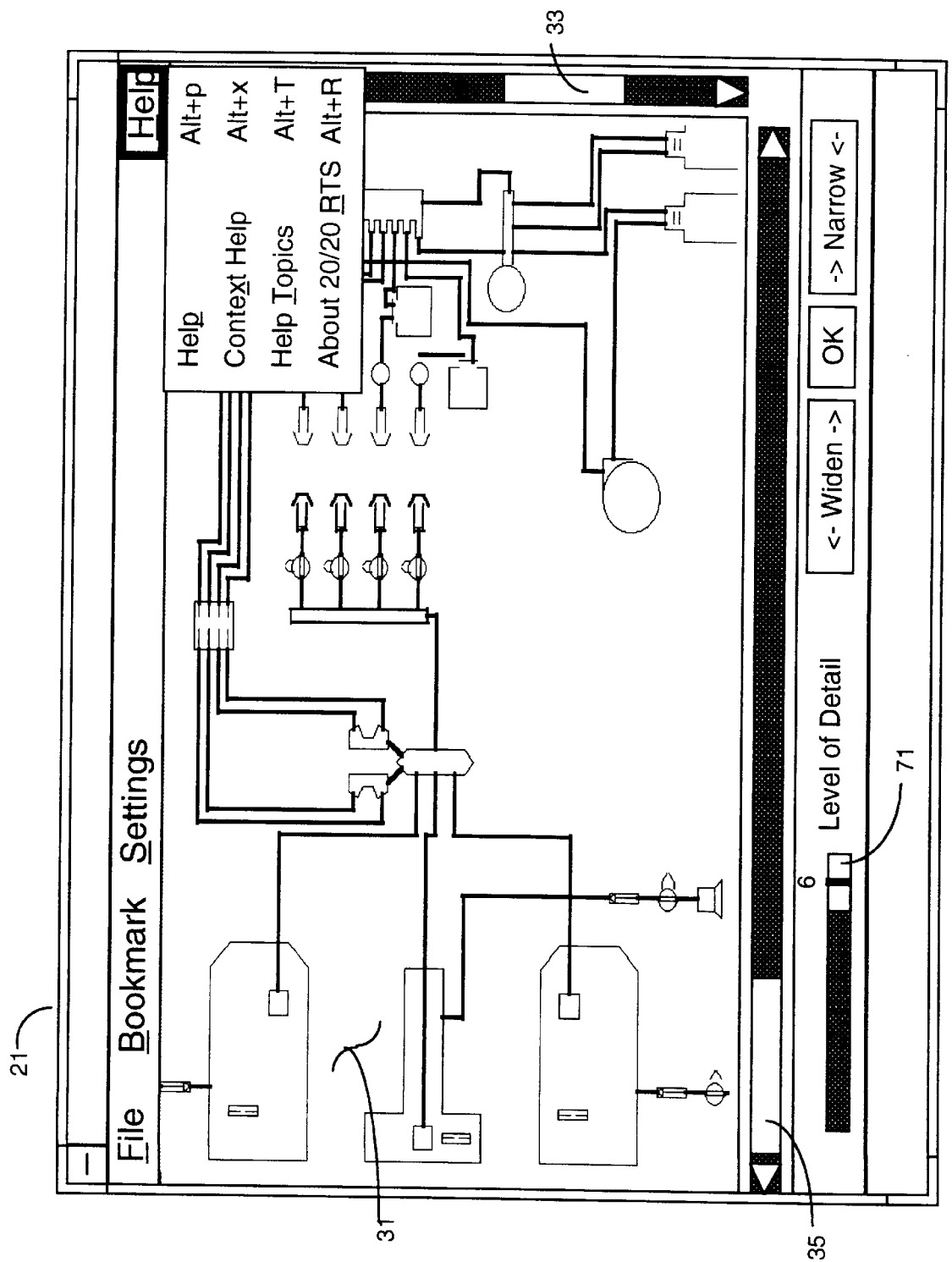
Figure 5Q:
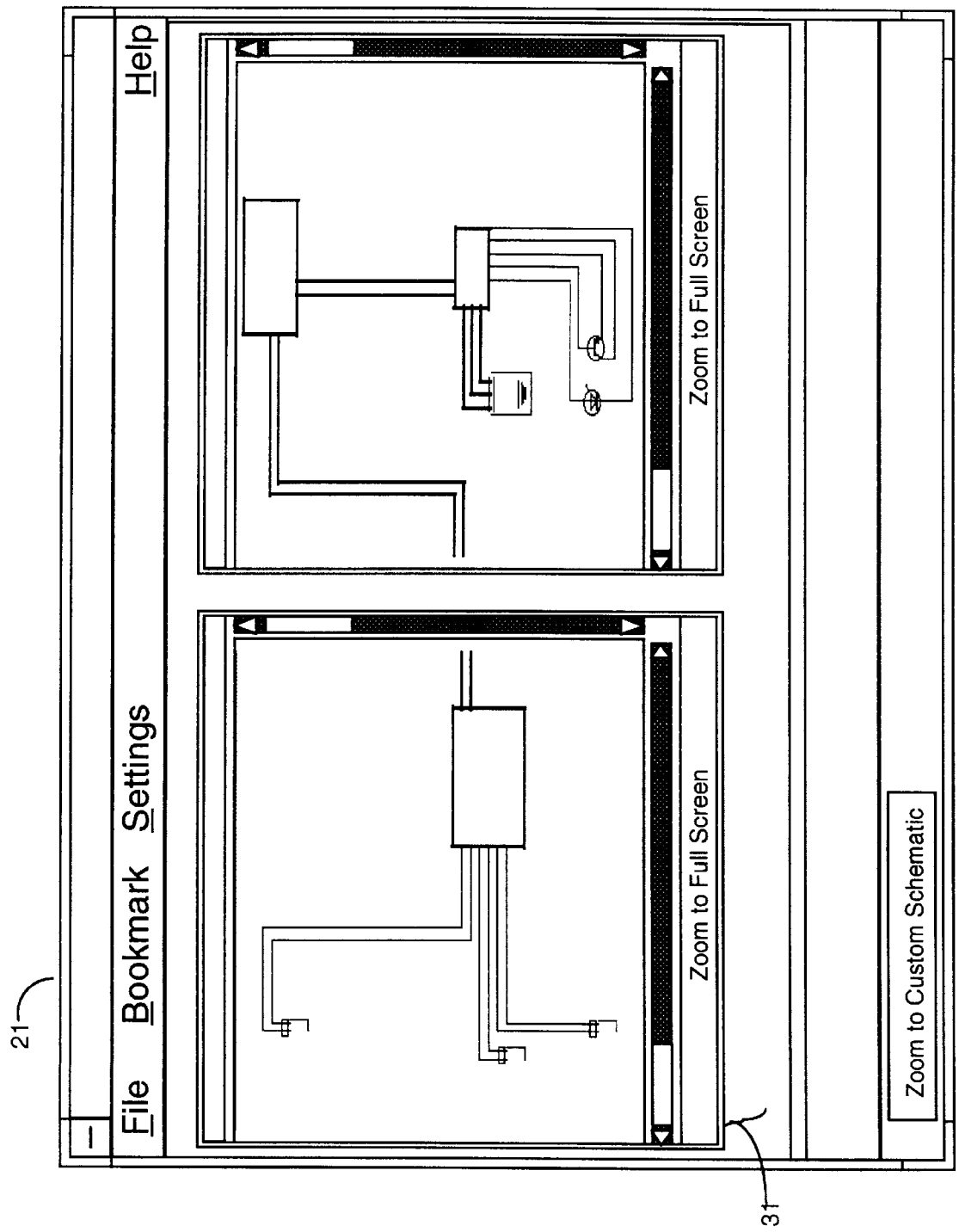

The operation of system 11 may be more readily understood by reference to FIGS. 5A–5Q. These figures show the information displayed on display 21 in a typical session. In FIG. 5A, the system has caused the display of a portion of a schematic which happens to be the portion of the schematic which was last displayed in the previous session. Note that display 21 displays a viewport 31 in which the schematic itself is display, an up-down slider bar 33, a left-right slider bar 35, and a set of selections "File", "Bookmark", "Settings", and "Help." The user uses the slider bars in conventional manner to maneuver about the schematic. Similarly, the user may select the desired selection "File", "Bookmark", "Settings", or "Help" in the conventional manner as well (by clicking on the selection, or by entering the appropriate key stroke combination).

FIG. 5B illustrates the choices when the user makes the "File" selection, namely "Select AOI" and "Return to IETM" which appear in a drop-down menu when "File" is selected. (Note that alternative key sequences for making the selections in the drop-down menu are also displayed in this screen, and as appropriate throughout all the screens.) The reference to "IETM" in the second choice is for use when the schematic display system 11 of the present invention is used in combination with an Interactive Electronic Technical Manual or similar maintenance tool. Although the present display system is especially suited for use with such maintenance tools, it is not limited thereto, and is intended to be a stand-alone tool.

When the user selects the "Select AOI" item in the drop-down menu of FIG. 5B, system 11 causes the display of the screen shown in FIG. 5C. In this screen, the system displays to the user a list 41 of defined areas of interest, along with a slider bar 43, and a data entry field 45. Either slider bar 43 or data entry field 45 may be used to select a defined area of interest, such as the "Electrical #1" AOI which the user has highlighted in FIG. 5D. Once a defined AOI is highlighted, system 11 displays the dialog popup 47 also shown in FIG. 5D which invites the user to confirm the selection of the "Delecsht4" area of interest. By clicking the "OK" button on the popup, the user is taken to the "Electrical #1" area of interest (that is system 11 causes the display of that AOI), indicated in the present case by the schematic shown in FIG. 5E.

Also shown in FIG. 5E is the drop-down menu which appears when the "Bookmark" selection is selected by the user. By making the first selection on this menu, "Create Bookmark", the user causes the system to display box 51 (FIG. 5F), which includes both a list of existing bookmarks, and a text field (labeled "Selection") for entering a bookmark name. If the user enters the name "Wheel Assy" in the text field, the system causes the display of the popup 55

(FIG. 5G), asking for confirmation. If "OK" is selected, the system associates the bookmark name "Wheel Assy" with the schematic portion being displayed at that time (in this case the five relays shown in FIGS. 5E–5G).

In FIG. 5H, the user has moved slider bars 33 and 35 up and to the right, respectively, to access a different part of the schematic. (Note the appearance of three display buttons "Widen", "OK" and "Narrow" below the viewport 31, which the user can use to change the scale of the display). To return to the previous place in the schematic, the user simply uses the "Bookmark" selection to bring up the "Go To Bookmark" dialog box shown in FIG. 5H and types in the desired bookmark name, in this case "Left Assembly." The system displays a confirmation popup 61, asking whether the user wants to go to the selected part of the schematic. In response to the user selection of "OK", system 11 returns the user to the portion of the schematic associated with that bookmark (see FIG. 5J). Note that in FIG. 5J the slider bars have automatically returned to their original position corresponding to the selected bookmark.

FIG. 5J also illustrates the use of the "Bookmark" selection to cause the display of a "delete bookmark" dialog box 63, by means of which the user can select and delete bookmarks as desired. In FIG. 5K, a popup 65 is shown which asks the user to confirm the deletion of a selected bookmark.

Setting the level of detail is illustrated in the figures starting with FIG. 5L. In FIG. 5L, the user may select the "Settings" key to cause the drop-down menu "Level of Detail" and "Widen/Narrow AOI" to be displayed. (Selecting Widen/Narrow AOI causes the "Widen" and "Narrow" keys discussed previously to be displayed). Note that the "Level of Detail" selection has a sub-menu (FIG. 5M) with the selections "Automatic" and "Manual."

Figure 6A:
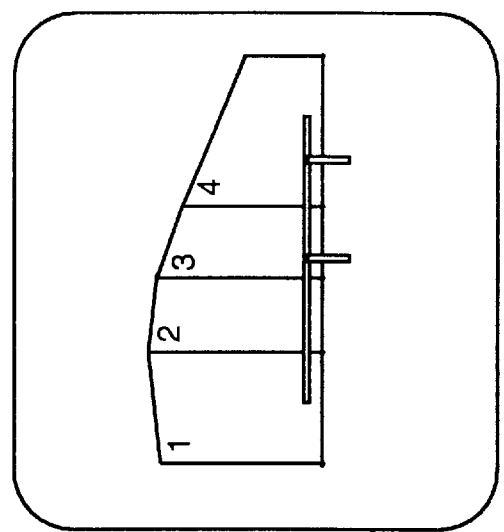
FIGS. 6A and 6B are simplified screens illustrating the difference in appearance of a schematic when displayed at different levels of detail by the schematic display system of FIG. 1.
Figure 6B:
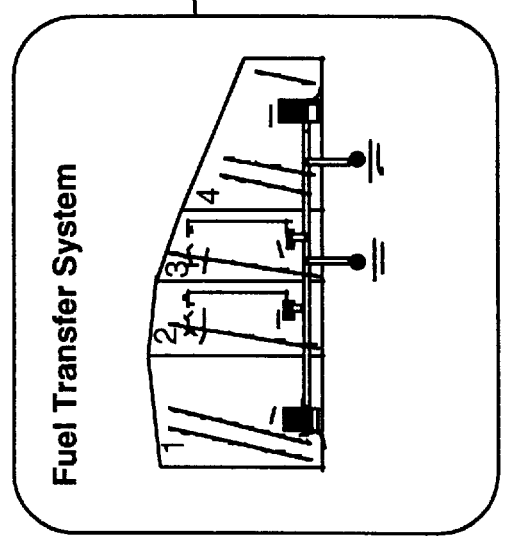

In response to the selection "Manual", the system causes the display of a slider bar 71 on a scale which indicates the present level of detail ("1" through "6") adjacent the slider bar. By moving the slider bar 71, the user can change the level of detail at which the present portion of the schematic is displayed. This is illustrated in FIGS. 6A and 6B (which are simplified versions of the screens of FIG. 5). In FIG. 6A, the user has selected the maximum level of detail (level 6), while in FIG. 6B, the user has selected a reduced level of detail (level 1). (It should be noted that in the "Automatic" mode, the slider bar is not displayed, and the level of detail displayed is controlled automatically).

Figure 7B:
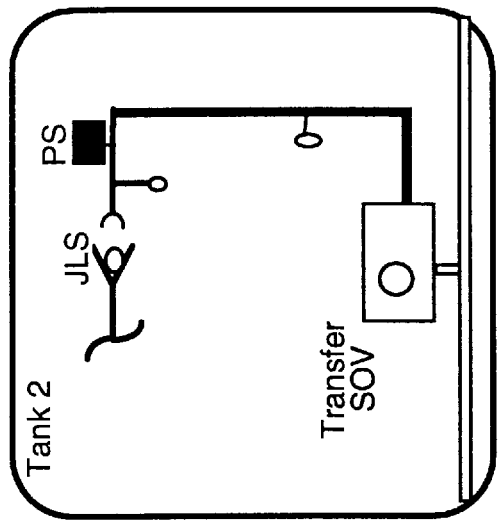
FIGS. 7A and 7B are simplified screens illustrating the change in level of detail as the area of interest of a schematic is widened and narrowed in the schematic display system of FIG. 1.
Figure 7A:
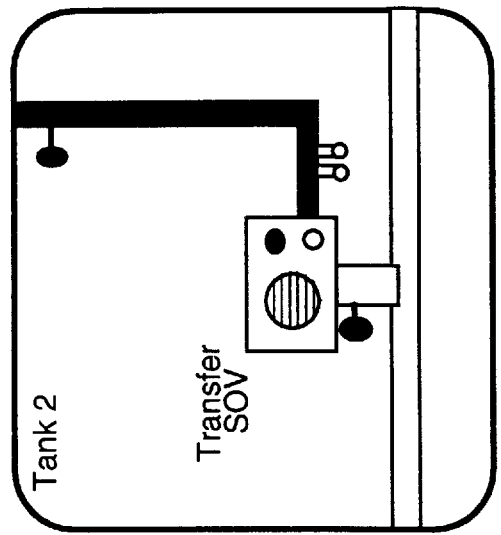

FIG. 5O differs from FIG. 5N in that in the former the "Widen" and "Narrow" buttons are also being displayed. The operation of system 11 in response to selection of these buttons is illustrated in FIGS. 7A and 7B (which again are simplified versions of the screens of FIG. 5). In response to selection of the "Narrow" button, system 11 causes the area of interest to narrow, with a corresponding increase in the level of detail (FIG. 7A). Similarly, in response to selection of the "Widen" button, system 11 causes the area of interest to widen, with a corresponding decrease in the level of detail (FIG. 7B).

Turning to FIG. 5P, there is illustrated the various "Help" selections of system 11, which do not form a part of the present invention. These selectable help topics include context sensitive help messages, an index of help topics, and the like. Further information about a particular object on a schematic can also be obtained from system 11 by selecting that object.

FIG. 5Q illustrates the display of a custom schematic by system 11. The slider bars adjacent each part of the custom schematic indicate the portion of the base schematic from which each part of the custom schematic is taken. Note the selectable buttons below each portion of the custom schematic which allows the user to "Zoom to Full Screen" either part of the custom schematic.

In view of the above, it will be seen that all the objects and features of the present invention are achieved, and other advantageous results obtained. The description of the invention contained herein is illustrative only, and is not intended in a limiting sense.

What is claimed is:

1. A schematic display system comprising:
   a memory having stored therein a data structure corresponding to an abstract schematic to be displayed;
   a processing unit operatively connected to the memory for retrieving data from the memory data structure;
   a visual display device under control of the processing unit for displaying at least selected portions of the schematic;
   manually operable inputs operatively connected to the processing unit for initiating manual requests to the processing unit for selecting at least one portion of the schematic for display and for changing the level of detail at which at least a selected portion of the schematic is displayed on the display device, said processing unit being responsive to said manual requests to retrieve the selected portions and to change the schematic level of detail correspondingly;
   said data structure stored in said memory including at least:
      a plurality of data representations of schematic objects, at least some of said schematic objects being composed of a plurality of component data objects, each component data object of a schematic object having an assigned level of detail, which assigned level of detail may differ for different component data objects of a given schematic object; and
      data representations of relationships between said schematic objects;
   said processing unit responsive to the selection of portions of the schematic to display only those component data objects associated with said selected portions, and to the selected level of detail at which the schematic is to be displayed to display only those component data objects whose assigned level of detail corresponds to the selected level of detail of display.

2. The schematic display system as set forth in claim 1 wherein the visual display device has a display area of a predetermined resolution, said assigned level of detail for each component data object being a function of said predetermined resolution.

3. The schematic display system as set forth in claim 2 wherein the assigned level of detail for each component data object is a function of the shape of said object.

4. The schematic display system as set forth in claim 2 wherein at least one component data object is text, said text having an assigned level of detail which is automatically preassigned independently of the assigned level of detail of non-textual component data objects.

5. The schematic display system as set forth in claim 2 wherein at least one component data object is at least a portion of a circle, the assigned level of detail of said circle component data object being a function of the minimum number of pixels required to display a circle on the visual display device having the predetermined resolution.

6. The schematic display system as set forth in claim 2 wherein at least one component data object is a straight line, the assigned level of detail of said straight line component data object being preassigned independently of the assigned level of detail of at least some non-straight line component data objects.

7. A schematic display system comprising:
- a memory having stored therein preprocessed data representative of an abstract schematic to be displayed:
- a digital processor operatively connected to the memory for retrieving preprocessed data from the memory;
- a visual display device under control of the processor for displaying at least selected portions of the schematic;
- inputs operatively connected to the processor for requesting a change in the level of detail at which at least a selected portion of the schematic is displayed on the display device, said processor being responsive to said requests to change the schematic level of detail correspondingly;
- said preprocessed data representative of the schematic including data representations of schematic objects and their relationships, at least some of said schematic objects being composed of a plurality of component data objects, at least some of the component data objects of a schematic object having an assigned level of detail, which assigned level of detail may differ for different component data objects of a given schematic object, said assigned level of detail being preassigned as a function of at least one display parameter of the visual display device.

8. The schematic display system as set forth in claim 7 wherein the display parameter of the visual display device is pixel density.

9. The schematic display system as set forth in claim 7 wherein the function includes a cut-off threshold in pixels for display of component data objects.

10. A schematic display system comprising:
- a memory having stored therein preprocessed data representative of an abstract schematic to be displayed, the preprocessed data arranged in a data structure for schematic objects and interconnections, said data structure including for at least some of the schematic objects, a plurality of component data objects making up a single schematic object, and a level of detail preassigned to each of said plurality of component data objects and interconnections;
- a digital processor operatively connected to the memory for retrieving preprocessed data from the memory;
- a visual display device under control of the processor for displaying at least selected portions of the schematic, the displayable area of said visual display device being known and being taken into account in preparing the preprocessed data;
- inputs operatively connected to the processor for selecting areas of interest of the schematic, said inputs including means for requesting a widening or narrowing of an area of interest, said processor being responsive to an input indicative of a request for changing the width of the area of interest to determine, from the preprocessed data and the size of the area of interest, the level of detail at which the requested area of interest is to be displayed on the display device; and
- said digital processor responsive to the determined level of detail at which the requested area of interest is to be displayed on the display device, and to the preassigned levels of detail for the component data objects, to cause the display of only those component data objects and interconnections whose preassigned level of detail corresponds to the determined level of detail.

11. The schematic display system as set forth in claim 10 further including manually operable input means for requesting a specific level of detail for display of the requested area of interest.

12. The schematic display system as set forth in claim 10 wherein said digital processor is further responsive to an input indicative of a request for changing the width of the area of interest to keep the geometric center of the displayed area of interest substantially the same irrespective of the amount of requested change of the width of the area of interest.

13. A schematic display system comprising:
- a memory having stored therein data representative of a schematic to be displayed;
- a digital processor operatively connected to the memory for retrieving schematic data from the memory;
- a visual display device under control of the processor for displaying at least selected portions of the schematic;
- inputs operatively connected to the processor for selecting areas of interest of the schematic, said inputs including means for defining at least a pair of non-contiguous areas of interest and for associating said pair of areas of interest together in a custom schematic;
- said processor being responsive to said inputs to store the identities of the non-contiguous areas of interest in the memory so that upon an input requesting display of said custom schematic said digital processor retrieves said identities from memory and controls the display device to display the custom schematic.

* * * * *